United States Patent
Kamon et al.

(10) Patent No.: US 6,975,361 B2
(45) Date of Patent: Dec. 13, 2005

(54) IMAGING SYSTEM, TWO-DIMENSIONAL PHOTOGRAPHING DEVICE AND THREE-DIMENSIONAL MEASURING DEVICE

(75) Inventors: Koichi Kamon, Kawanishi (JP); Eiichi Ide, Itami (JP); Fumiya Yagi, Toyonaka (JP); Takashi Kondo, Sakai (JP)

(73) Assignee: Minolta Co., Ltd., Osaka (JP)

( * ) Notice: Subject to any disclaimer, the term of this patent is extended or adjusted under 35 U.S.C. 154(b) by 804 days.

(21) Appl. No.: 09/788,660

(22) Filed: Feb. 21, 2001

(65) Prior Publication Data

US 2001/0031143 A1 Oct. 18, 2001

(30) Foreign Application Priority Data

| Feb. 22, 2000 | (JP) | ........................................ 2000-044031 |
| Mar. 31, 2000 | (JP) | ........................................ 2000-097239 |
| Mar. 31, 2000 | (JP) | ........................................ 2000-097240 |

(51) Int. Cl.[7] .................... H04N 5/225; H04N 7/18; G06K 9/00; G01C 17/00; G01C 3/00
(52) U.S. Cl. .................... 348/375; 348/135; 348/139; 382/154; 702/152; 356/3.01; 356/3.11
(58) Field of Search ............................... 348/135, 375, 348/211.1, 211.4, 211.5, 211.9, 231.3, 231.6, 138, 139, 140, 350; 382/154; 702/152, 153; 250/559.31, 559.38; 356/3.01, 3.11, 4.01

(56) References Cited

U.S. PATENT DOCUMENTS

| 6,049,385 | A | * | 4/2000 | Norita et al. ............... 356/613 |
| 6,172,755 | B1 | * | 1/2001 | Norita et al. ............... 382/154 |
| 6,587,183 | B1 | * | 7/2003 | Uomori et al. ............... 356/3.1 |
| 6,721,007 | B1 | * | 4/2004 | Tani et al. ................... 348/348 |
| 6,734,450 | B2 | * | 5/2004 | Kakiuchi et al. ........... 250/221 |
| 6,738,516 | B1 | * | 5/2004 | Kondo et al. ............... 382/154 |
| 6,864,910 | B1 | * | 3/2005 | Ogino et al. .................. 348/42 |
| 6,864,911 | B1 | * | 3/2005 | Zhang et al. ................. 348/42 |
| 6,882,435 | B2 | * | 4/2005 | Yagi et al. .................. 702/152 |
| 2001/0003465 | A1 | * | 6/2001 | Ito et al. ..................... 348/348 |
| 2001/0033685 | A1 | * | 10/2001 | Ishiyama .................... 382/154 |

FOREIGN PATENT DOCUMENTS

| EP | 999429 A1 | * | 5/2000 | ........... G01B/11/00 |
| JP | 11-248431 | | 9/1999 | |
| JP | 11-271030 | | 10/1999 | |
| JP | 2000-76453 | | 3/2000 | |
| JP | 2000-207549 | | 7/2000 | |

* cited by examiner

Primary Examiner—Wendy R. Garber
Assistant Examiner—John M. Villecco
(74) Attorney, Agent, or Firm—McDermott Will & Emery LLP

(57) ABSTRACT

A system comprises a two-dimensional photographing device and a three-dimensional measuring device that is removably attached to the two-dimensional photographing device. The two-dimensional photographing device and the three-dimensional measuring device can communicate with each other. Information indicating an operating condition of one of the devices is transmitted to the other device, which receives the information and sets own operating condition in accordance with the received information for photographing or measuring.

18 Claims, 29 Drawing Sheets

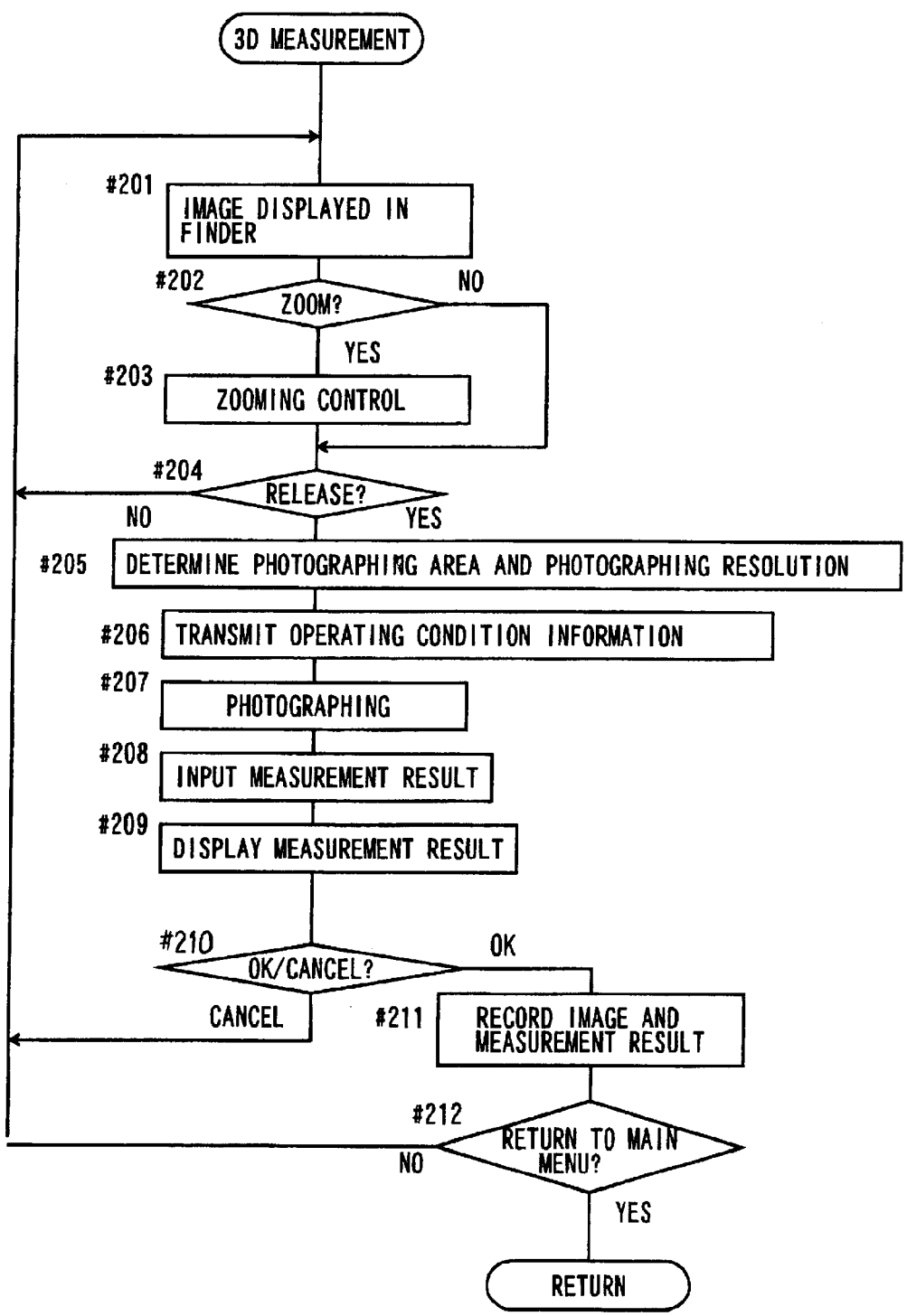
F I G. 2 3

IMAGING SYSTEM, TWO-DIMENSIONAL PHOTOGRAPHING DEVICE AND THREE-DIMENSIONAL MEASURING DEVICE

BACKGROUND OF THE INVENTION

1. Field of the Invention

The present invention relates to a two-dimensional photographing device, a three-dimensional measuring device and a imaging system including the two-dimensional photographing device and the three-dimensional measuring device that is removably attached to the two-dimensional photographing device.

2. Description of the Prior Art

A digital camera that is used for taking a two-dimensional image and for outputting the image data has been widespread. Image data acquired by using a digital camera can be viewed privately, or can be exhibited easily in a home page on a web site, for example.

Moreover, users of a three-dimensional measuring device for exhibiting three-dimensional data instead of the two-dimensional image increasing gradually. Such a three-dimensional measuring device is disclosed in Japanese unexamined patent publication No. 11-271030, for example. The use of the three-dimensional data is suitable for a presentation of goods, which can be observed from many directions by using the three-dimensional data.

However, the three-dimensional data acquired by using a three-dimensional measuring device have more information volume than a two-dimensional data (image data) acquired by using a digital camera. Therefore, it is not easy to handle three-dimensional data because of disadvantages thereof such as a complicated data processing, a long processing time and a large memory that is necessary.

Thus, since three-dimensional data and two-dimensional data have their own merits and demerits, they should be used properly in accordance with an application. Consequently, both a two-dimensional photographing device and a three-dimensional measuring device are necessary for acquiring their data.

In order to satisfy such a request, an apparatus that can be used for the two-dimensional photographing and for the three-dimensional measuring (VIVID700) is introduced on the market by the applicant. The apparatus includes a two-dimensional photographing device and a three-dimensional measuring device that are integrated, so the user can acquire two-dimensional data and three-dimensional data simultaneously by an easy operation.

However, the apparatus has a disadvantage in that the three-dimensional measuring device cannot be removed since it is integrated in the apparatus, so that the apparatus is larger and harder to handle than a two-dimensional photographing device when taking only two-dimensional image.

SUMMARY OF THE INVENTION

An object of the present invention is to provide a imaging system that includes a two-dimensional photographing device and a three-dimensional measuring device that are removably attached to each other so that the system can be used easily for acquiring both two-dimensional data and three-dimensional data. Another object is to provide a two-dimensional photographing device and a three-dimensional measuring device that are used for the imaging system.

In the preferred embodiment of the present invention, a imaging system includes a two-dimensional photographing device and a three-dimensional measuring device that is removably attached to the two-dimensional photographing device. The two-dimensional photographing device and the three-dimensional measuring device can be communicated with each other. When information indicating an operating condition of one of the two devices is transmitted to the other device, the other device automatically sets its own operating condition so as to perform photographing or measuring in accordance with the received information.

The operating condition of the two-dimensional photographing device includes a photographing area, a photographing resolution, a focal distance, the number of pixels, a magnification ratio, for example. The operating condition of the three-dimensional measuring device includes a measuring area, a measuring resolution, an angle of measuring area and the number of measuring points.

According to another preferred embodiment of the present invention, the imaging system includes a display portion for displaying a two-dimensional image of a subject acquired by the two-dimensional photographing device and a display controlling portion for displaying a measuring area of the three-dimensional measuring device long with the two-dimensional image in the display portion.

According to still another preferred embodiment of the present invention, the three-dimensional measuring device includes an acquiring portion for measuring a distance to the subject for at least one point so as to acquire measured distance information and an outputting portion for outputting the measured distance information to the two-dimensional photographing device. The two-dimensional photographing device includes a photographing portion for taking a two-dimensional image of a subject, an optical system for forming an image of the subject in the photographing portion, a receiving portion for receiving the measured distance information outputted by the three-dimensional measuring device and a controlling portion for controlling a focal state of the optical system in accordance with the measured distance information received by the receiving portion.

Other objects and features of the present invention will be made clear by the following explanations about the drawings and embodiments.

BRIEF DESCRIPTION OF THE DRAWINGS

FIG. 23 is a flowchart showing a routine of three-dimensional process of the digital camera.

DESCRIPTION OF THE PREFERRED EMBODIMENTS

Hereinafter, the present invention will be explained more in detail with reference to embodiments and drawings.

Figure 1:
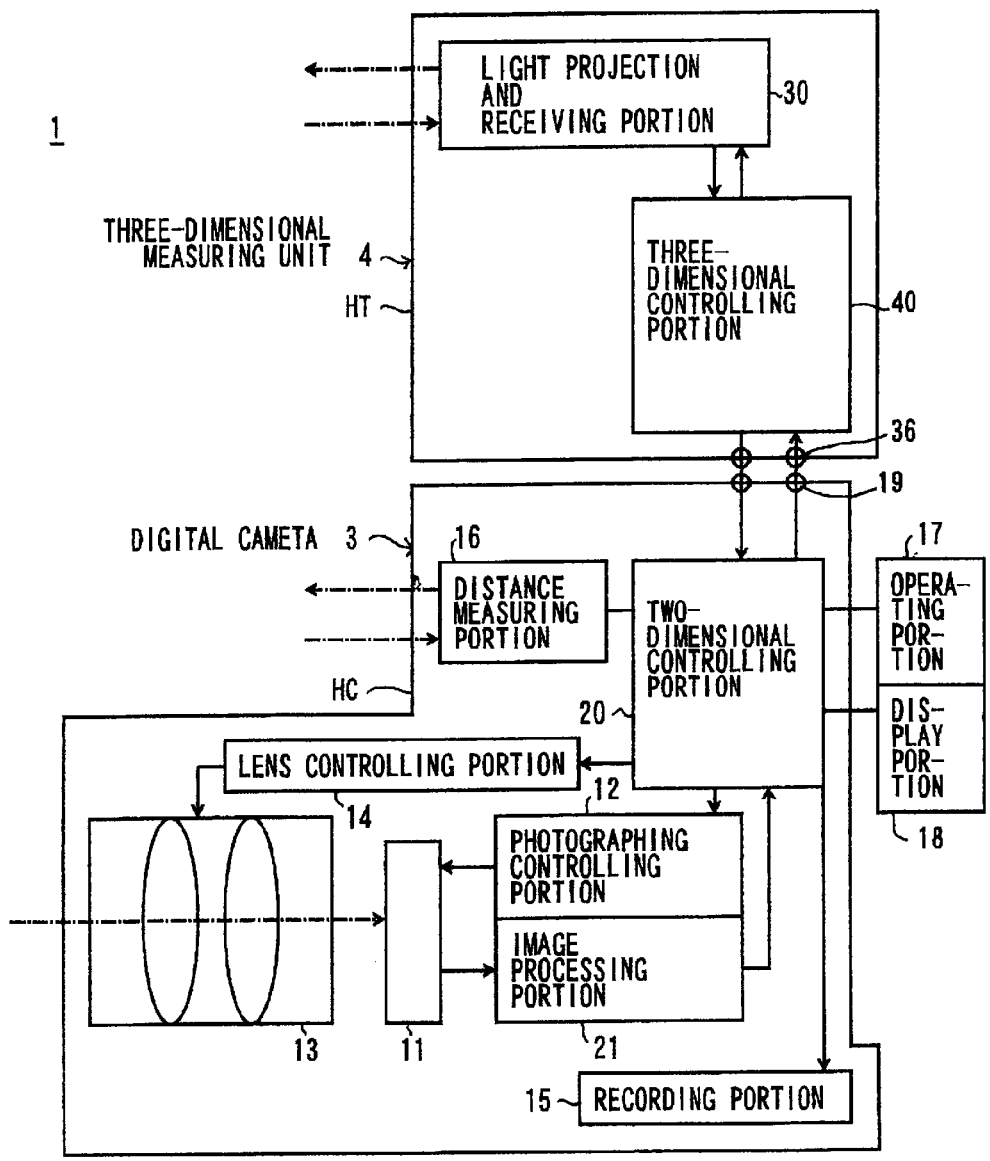
FIG. 1 is a diagram showing a schematic structure of a imaging system according to one embodiment of the present invention.
Figure 2:
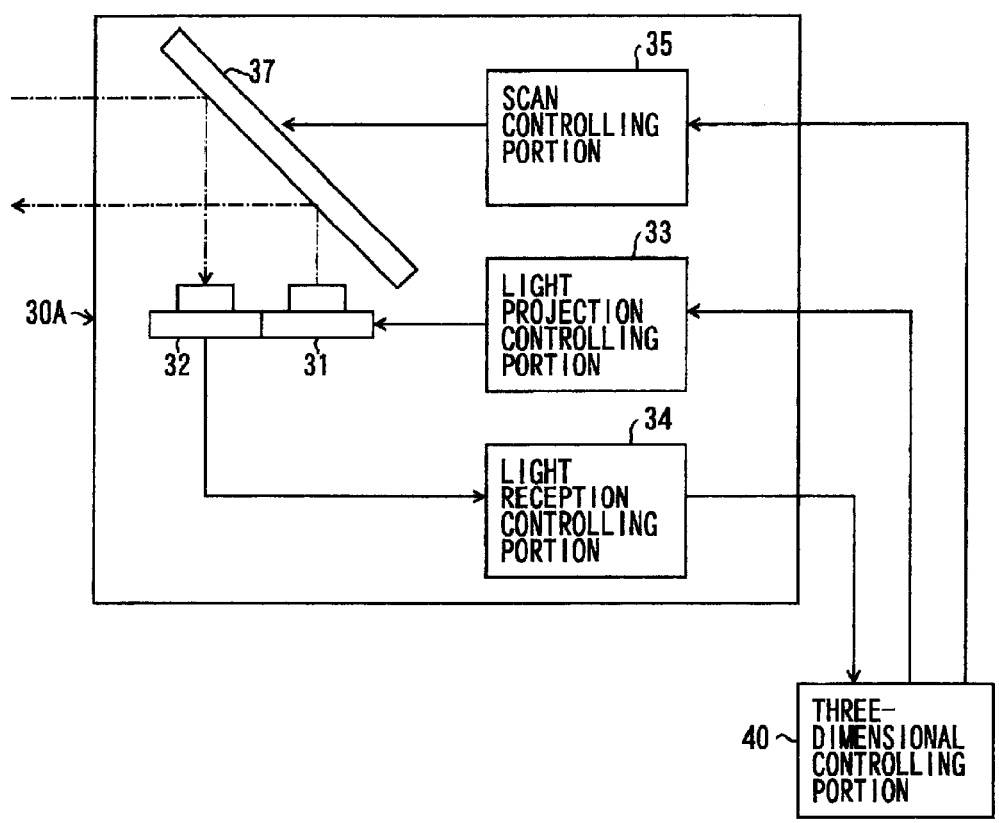
FIG. 2 is a diagram showing an example of a light projection and receiving portion of a TOF method.
Figure 3:
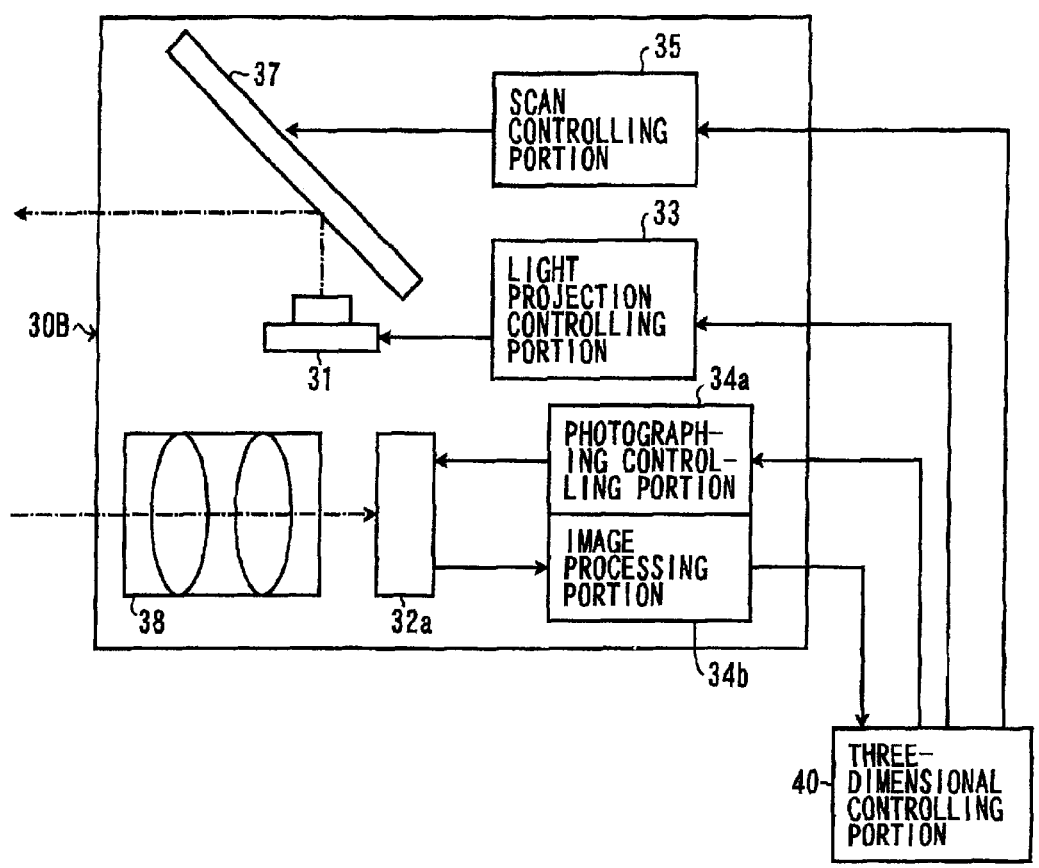
FIG. 3 is a diagram showing an example of a light projection and receiving portion of a light section method.

FIG. 1 is a diagram showing a schematic structure of a imaging system 1 according to an embodiment of the present invention. FIG. 2 is a diagram showing an example of a light projection and receiving portion 30A of a time of flight (TOF) method. FIG. 3 is a diagram showing an example of a light projection and receiving portion 30B of a light section method.

In FIG. 1, the imaging system 1 includes a digital camera 3 that is a two-dimensional photographing device and a three-dimensional measuring unit 4 that is separated from the digital camera 3 and is removably attached to the digital camera 3. Though being not shown, a flash lamp 5 is removably attached to the digital camera 3 if necessary.

The digital camera 3 includes a body housing HC, an area sensor 11, a photographing controlling portion 12, a group of lenses 13, a lens controlling portion 14, a recording portion 15, a distance measuring portion 16, an operating portion 17, a display portion 18, a connector 19, a two-dimensional controlling portion 20, and an image processing portion 21.

The area sensor 11 includes a CCD image sensor for acquiring a two-dimensional image of a subject. The photographing controlling portion 12 controls the area sensor 11 and reads data out of the area sensor 11.

The group of lenses 13 includes a zooming lens and a focusing lens. The group of lenses 13 is controlled by the lens controlling portion 14 for automatic focusing (AF), so as to focus an image of a subject on the area sensor 11. The automatic focusing control is executed in accordance with measurement result data outputted by the three-dimensional measuring unit 4 if it is attached. Otherwise, the control is executed in accordance with a measurement result of the distance measuring portion 16.

The recoding portion 15 is a hard disk drive (HDD) or includes a removable recording media such as a magneto-optical disk drive, flash memory, a smart media, or a mini disk (MD). The recording portion 15 stores a two-dimensional image acquired by the area sensor 11, three-dimensional data acquired by the three-dimensional measuring unit 4 or other attribution data.

The distance measuring portion 16 can be a conventional distance measuring apparatus such as a general active type. The distance can be measured only for one point on the screen within the photographing area. The distance measuring portion 16 is used only when the digital camera 3 is used as a single unit. If the three-dimensional measuring unit 4 is attached, the measurement result data outputted from the three-dimensional measuring unit 4 is used. So, the distance measuring portion 16 is not used.

As the operating portion 17, a release button, a power button, a zooming button, a menu selecting button and other buttons are provided. As the zooming button, two buttons are provided for a distance (TELE) and a close (WIDE). As the menu selecting button, four buttons for moving a cursor in the horizontal or the vertical direction and a button for confirming the entry.

The display portion 18 displays a two-dimensional image acquired by the area sensor 11. Therefore, the display portion 18 also works as an electronic finder in the two-dimensional photographing. The display portion 18 displays a menu, a message, and other characters or images.

Moreover, the display portion 18 displays information of a measuring area of the three-dimensional measuring unit 4 and information for designating the measuring area along with the two-dimensional image when the three-dimensional measuring unit 4 is attached. In addition, three-dimensional data acquired by the three-dimensional measuring unit 4 are displayed as a gray-scale image. A menu of three-dimensional measuring is also displayed.

The connector 19 becomes a connection node for transmitting a signal or data between the digital camera 3 and the three-dimensional measuring unit 4, when the three-dimensional measuring unit 4 is attached to the digital camera 3.

The two-dimensional controlling portion 20 controls each portion of the digital camera 3 and controls a communication between the digital camera 3 and the three-dimensional controlling portion 40 of the three-dimensional measuring unit 4. In this communication, the digital camera 3 transmits parameters of the digital camera 3 including a focal distance, a state of being zoomed or not, a resolution and other data of the area sensor 11, and receives parameters of the three-dimensional measuring unit 4 including a measurement principle, measurable distance range, a resolution and a measurable angle of view, and measurement result data (including three-dimensional data) as a result of the three-dimensional measuring.

The above-mentioned portions are housed in the body housing HC or attached to the surface of the same. The body housing HC constitutes the digital camera 3 as one camera. The digital camera 3 can be used as a normal digital camera (an electronic camera) without the three-dimensional measuring unit 4.

The three-dimensional measuring unit 4 includes a body housing HT, a light projection and receiving portion 30, and a three-dimensional controlling portion 40. The light projection and receiving portion 30 can employ various methods such as a TOF or a light section method.

For example, the TOF light projection and receiving portion 30A as shown in FIG. 2 includes a light projection portion 31, a light receiving portion 32, a light projection controlling portion 33, a light reception controlling portion 34, a scan controlling portion 35, and a scanning mirror 37.

The light projection portion 31 projects a laser pulsed light. The pulsed light is reflected by the subject (object), and the reflected light is received by the light receiving portion 32. The light projection portion 31 employs a laser diode, for example. The light receiving portion 32 employs a photodiode, for example. They are controlled by the light projection controlling portion 33 and the light reception controlling portion 34, respectively. By measuring the time from the projection (light emission) of the pulsed light to the light reception, distance information can be acquired.

This measuring method can acquire distance information of a whole area of the subject by one measurement. The pulsed light is deflected by the scanning mirror 37 for scanning the projecting direction (the measuring direction), so that distance distribution information in a predetermined area is acquired. Though only the scanning mirror 37 for deflecting the pulsed light in the vertical direction is illustrated in FIG. 2, another scanning mirror for deflecting the pulsed light in the horizontal direction is also provided.

As shown in FIG. 3, the light projection and receiving portion 30B of the light section method includes a light projection portion 31, an area sensor 32a, a light projection controlling portion 33, a photographing controlling portion 34a, an image processing portion 34b, a scan controlling portion 35, a scanning mirror 37, and a group of lenses 38.

The light projection portion 31 projects a laser pulsed light or a slit light. The light reflected by subject passes the group of lenses 38 and received by the area sensor 32a. In accordance with the output of the area sensor 32a, a light reception position of the reflected light on the area sensor 32a is determined. In accordance with the light reception position and a projection angle of the laser beam, the distance information to the subject can be determined using a triangulation principle. The projection angle of the laser beam, i.e., the measuring direction is deflected by the scanning mirror 37 so as to scan a predetermined area for the measurement.

The light section method includes a first type and a second type. In the first type, the light reception position on the area sensor 32a is detected for each timing (each projection angle of the laser beam) of the measurement. In the second type, the timing when the reflected light passes each pixel (each projection angle of the laser beam) is detected for each pixel of the area sensor 32a.

In the first type, the distance information is determined for the slit direction of sampling. Therefore, if the slit light is deflected for the measurement, the resolution varies depending on a sampling period (a time interval of fetching data).

In the second type, the distance information is acquired for the direction in which each pixel faces. Therefore, the resolution depends on the number of pixels of the sensing surface, and the number of pixels is changed by performing an interpolation process.

The three-dimensional controlling portion 40 controls portions of the three-dimensional measuring unit 4 and controls communication between the three-dimensional measuring unit 4 and the two-dimensional controlling portion 20 of the digital camera 3 as explained above. The power of the three-dimensional measuring unit 4 can be supplied from the digital camera 3 through another connector or a connection terminal (not shown).

The imaging system 1 performs communication between the digital camera 3 and the three-dimensional measuring unit 4. When information indicating an operating condition of one of them is transmitted to the other, the other sets its operating condition in accordance with the received information so as to perform photographing or measuring.

Namely, it is necessary to match the operating conditions of the digital camera 3 and the three-dimensional measuring unit 4 when using both of them for photographing. The operating condition in this case is mainly a capturing area (a photographing area and a measuring area) and a resolution (the photographing resolution and the measuring resolution).

If the digital camera 3 and the three-dimensional measuring unit 4 are integrated, they can be preset in the optimum operating condition. They can be also preset in the optimum operating condition in the case where they are removably attached to each other as long as the same combination.

However, in this embodiment, the digital camera 3 and the three-dimensional measuring unit 4 having different specifications respectively can be attached to each other. For example, the specification of the digital camera 3 is different in accordance with the difference of a format or a type of a lens, a zooming function, the number of pixels of the area sensor, or a shape and dimensions of the body housing HC. The specification of the three-dimensional measuring unit 4 is different In accordance with the difference of a type of the measuring method, a measuring distance, a measuring area, an accuracy, or a shape and dimensions of the body housing HT. Even the same type can have a different operating condition in accordance with the used state depending on a user.

Therefore, in order to perform the optimum photographing or measuring, it it necessary to know the operating condition of the other device. When knowing the capturing area of the one device, the capturing area of the other device can be determined properly. For example, the capturing area of one device is set so as to cover the capturing area of the other device. Alternatively, the capturing area of one device is set so as to be included in the capturing area of the other device. In addition, when knowing the resolution of one device, the resolution of the other device can be determined properly, e.g., so as to be substantially the same resolution.

In this way, a well-matched capturing can be performed by setting the operating condition of one device in accordance with the operating condition of the other device. As a result, when pasting the two-dimensional data to the three-dimensional data for composing a three-dimensional image, for example, the three-dimensional image can be generated easily and with a good accuracy.

Moreover, a digital camera 3 and a three-dimensional measuring unit 4 having various specifications respectively can be combined, so that a flexibility of acquiring a two-dimensional imaging or the three-dimensional measuring can be improved. Thus, a required two-dimensional image or three-dimensional data can be acquired easily.

Next, the capturing area and the resolution of the digital camera 3 and the three-dimensional measuring unit 4 will be explained.

Figure 4:
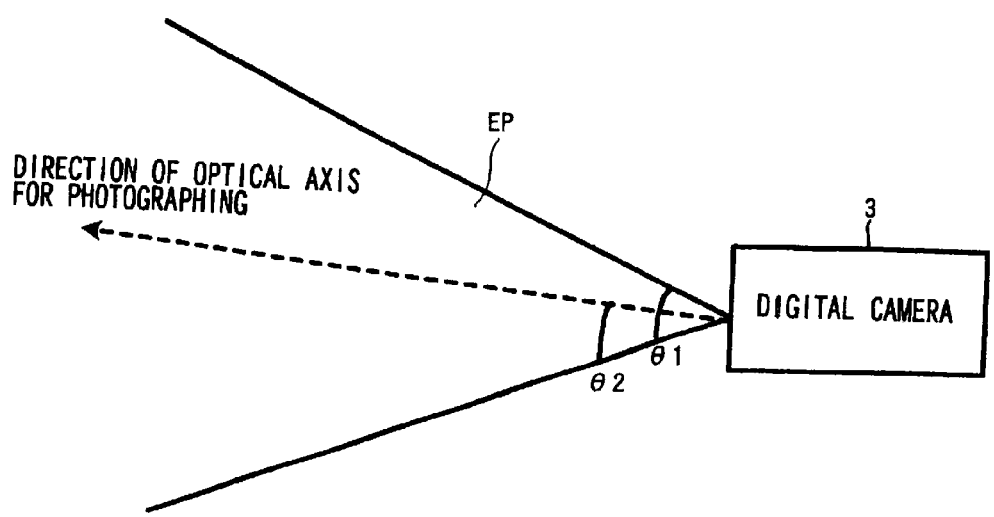
FIG. 4 is a diagram for explaining a photographing area of a digital camera.
Figure 5:
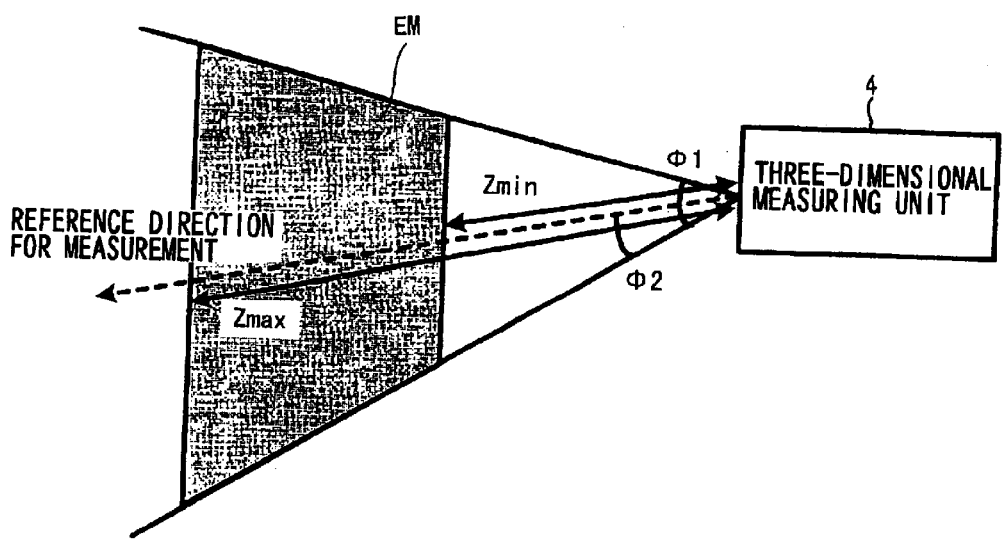
FIG. 5 is a diagram for explaining a measuring area of a three-dimensional measuring unit.
Figure 6:
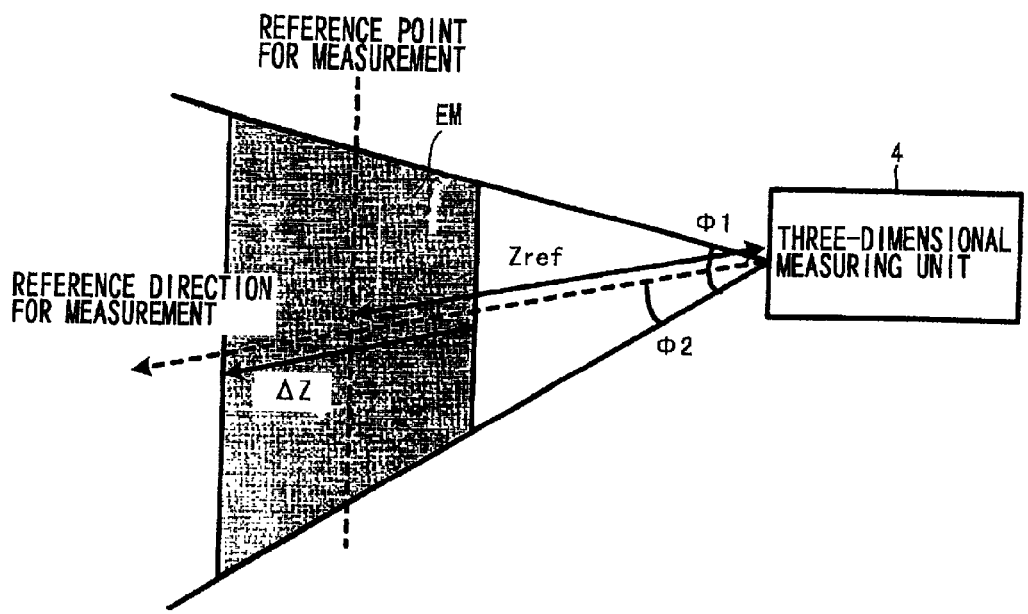
FIG. 6 is a diagram for explaining a measuring area of a three-dimensional measuring unit.
Figure 7:
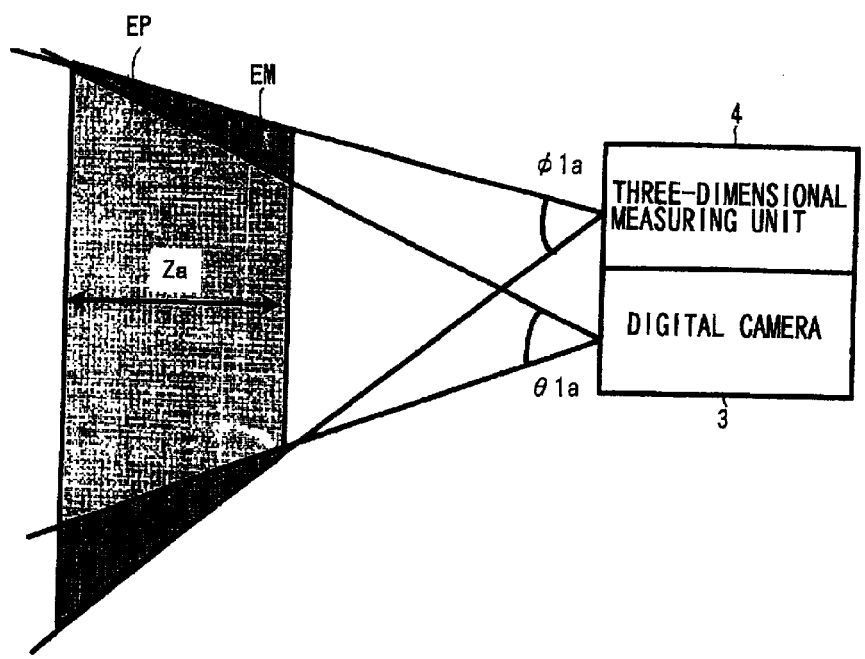
FIG. 7 is a diagram showing the state in which the measuring area is set to cover the photographing area.
Figure 8:
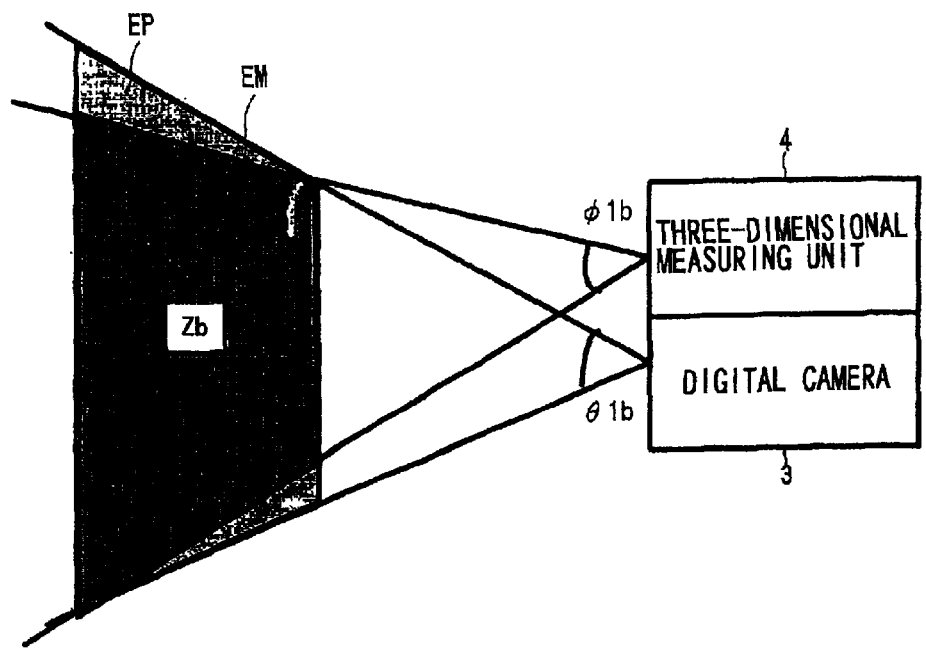
FIG. 8 is a diagram showing the state in which the photographing area is set to cover the measuring area.
Figure 9:
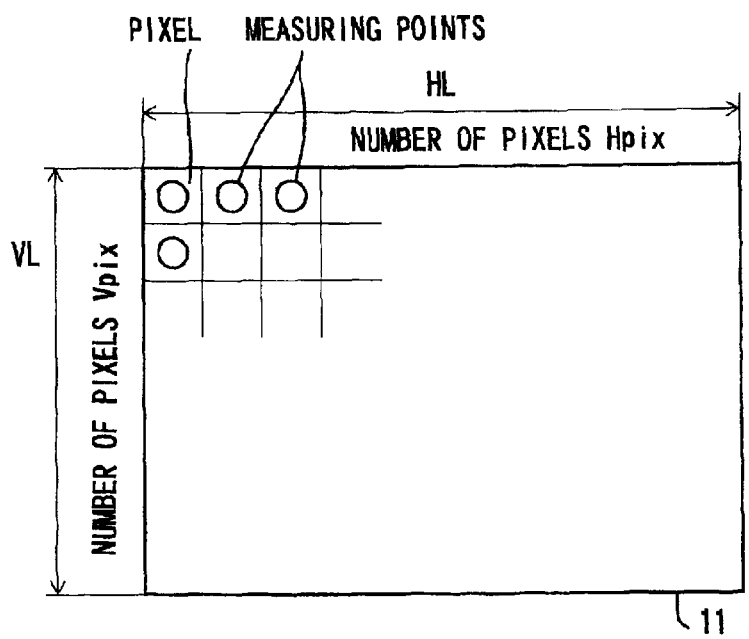
FIG. 9 is a diagram showing a sensing surface of an area sensor.

FIG. 4 is a diagram for explaining a photographing area EP of a digital camera 3. FIGS. 5 and 6 are diagrams for explaining a measuring area EM of a three-dimensional measuring unit 4. FIG. 7 is a diagram showing the state in which the measuring area EM of the three-dimensional measuring unit 4 is set to cover the photographing area EP of the digital camera 3. FIG. 8 is a diagram showing the state in which the photographing area EP of the digital camera 3 is set to cover the measuring area EM of the three-dimensional measuring unit 4. FIG. 9 is a diagram showing a sensing surface of an area sensor 11.

As shown in FIG. 4, the photographing area EP of the digital camera 3 is denoted with an angle of view θ1. The fiducial point of the angle of view θ1 is a principal point (a front principal point) of the group of lenses 13. Though only the angle of view θ1 in the vertical direction (X direction) is shown in FIG. 4, it is similar in the horizontal direction. The angle of view θ1 is determined in accordance with vertical and horizontal dimensions VL, HL of the sensing surface of the area sensor 11 (see FIG. 9), and a focal distance f of the group of lenses 13. Namely, the angle of view θ1 is derived by the following equation.

$$\theta 1 = 2 \times \arctan(h/b)$$

Here, the letter "h" is a half of the dimension of the area sensor 11. Namely, h=VL/2 concerning the vertical direction, and h=HL/2 concerning the horizontal direction. The letter "b" is a distance between the principal point of the group of lenses 13 and the area sensor 11 and can be usually approximated to equal to the focal distance f.

The position of the angle of view θ1 is defined by the angle θ2 between the lower edge line and the optical axis as shown in FIG. 4. The angle of view θ1 is usually symmetric with respect to the optical axis. The above equation is predicated on the symmetry with respect to the optical axis. In this case, θ2=θ½. However, asymmetry with respect to the optical axis is possible.

The optical axis is usually provided in parallel to a reference plane of the body housing HC of the digital camera 3, e.g., a mounting surface of the three-dimensional measuring unit 4. However, optical axis can be provided to have a right angle or an appropriate angle with respect to the reference plane.

As shown in FIG. 5 and FIG. 6, the measuring area EM of the three-dimensional measuring unit 4 is usually determined by a scan angle φ1 of the laser beam by the scanning mirror 37, for example. The scan angle φ1 is, usually asymmetric with respect to an axis that is parallel with the optical axis of the digital camera 3. Therefore, it is necessary to determine an angle φ2 between a reference direction and a specific position in the scan angle φ1. The reference direction is set so as to cross the optical axis of the digital camera 3 within a distance area in which the three-dimensional measuring can be performed, for example. Furthermore, as the reference direction, a reference plane of the body housing HT of the three-dimensional measuring unit 4 can be used.

In addition, concerning the measuring area EM, the Z-axis direction (depth direction) can be defined by the minimum distance Zmin and the maximum distance Zmax as shown in FIG. 5 or defined by a distance Zref to a reference position and the distance area ΔZ as shown in FIG. 6.

As shown in FIG. 7, the photographing area EP of the digital camera 3 is covered by the measuring area EM of the three-dimensional measuring unit 4. In this case, the three-dimensional data are acquired for the entire of the two-dimensional image acquired by the digital camera 3. Furthermore, when displaying the two-dimensional image on the finder, the three-dimensional data can be acquired for the entire image that can be viewed through the finder. Therefore, a user can perform capturing with confirming that the three-dimensional data can be acquired for the portion that can be viewed through the finder.

As shown in Fig. B. the measuring area EM of the three-dimensional measuring unit 4 is covered by the photographing area EP of the digital camera 3. In this case, the two-dimensional image can be acquired for the entire of the three-dimensional data acquired by the three-dimensional measuring unit 4. Therefore, the two-dimensional image can be pasted to the entire of the acquired three-dimensional data. In addition, since the three-dimensional data are the necessary minimum, the measuring process can be executed at high speed. In this case, the measuring area EM of the three-dimensional data is displayed in the finder so as to confirm the measuring area EM.

In either case of FIG. 7 or FIG. 8, at least one of the digital camera 3 and the three-dimensional measuring unit 4 can be controlled. Concerning adoption of the configuration of FIG. 7 or FIG. 8, it is possible to constitute that a user can set a mode.

The resolution (the photographing resolution) of the digital camera 3 can be determined by the number of pixels in the vertical and the horizontal directions Vpix, Hpix of the area sensor 11, or by the number of pixels and the angle of view θ1. It is possible to increase or decrease the resolution by an image processing such as an electronic enlarging process or sizing process (an electronic zooming or a resolution conversion process).

The resolution of the three-dimensional measuring unit 4 (measuring resolution) is determined by the number of the measuring points, or by the number of the measuring points and the scan angle φ1. More specifically, in the case of the TOF method, for example, the resolution is determined by the scanning speed of the scanning mirror 37 and the light projection time interval of the laser in the light projection portion 31. In the case of the light section method, the resolution is determined by a data fetch time interval for the first type as explained above, while for the second type it is determined by the number of pixels in the sensing surface of the area sensor 32a (by the number of pixels after the interpolation if the interpolation process is executed). More over, the scanning speed of the scanning mirror 37 is related to the determination of the scan angle φ1. In the same way as in the case of the digital camera 3, it is possible to increase or decrease the resolution by an electronic resolution conversion process.

In addition, concerning the relationship between the photographing resolution of the digital camera 3 and the measuring resolution of the three-dimensional measuring unit 4 can be dealt in the same way as the relationship between the capturing areas thereof.

Namely, as shown in FIGS. 7 and 8, there are three possible relationships concerning the overlapping portion between the photographing area BP and the measuring area EM. In the first relationship, the number of the measuring points Vpnta, Hpnta in the vertical and the horizontal directions of the three-dimensional measuring unit 4 is larger than the number of pixels Vpixa, Hpixa in the vertical and the horizontal directions of the two-dimensional image of the digital camera 3. In the second relationship, the number of pixels Vpixa, Hpixa in the vertical and the horizontal directions of the two-dimensional image of the digital camera 3 is larger than the number os-the measuring points Vpnta, Hpnta in the vertical and the horizontal directions of the three-dimensional measuring unit 4. In the third relationship, the number of the measuring points Vpnta, Hpnta in the vertical and the horizontal directions of the three-dimensional measuring unit 4 is equal to the number of pixels Vpixa, Hpixa in the vertical and the horizontal directions of the two-dimensional image of the digital camera 3. In any case, at least one of the number of pixels and the number of the measuring points can be controlled.

In order to transmit and receive the capturing areas EP, EM and the resolution, it is necessary to determine the contents of the communication, i.e., which parameter or physical quantity should be transmitted. In addition, in order to acquire the parameter or the physical quantity to be transmitted, it is necessary to acquire necessary information for an appropriate calculation.

Figure 10:
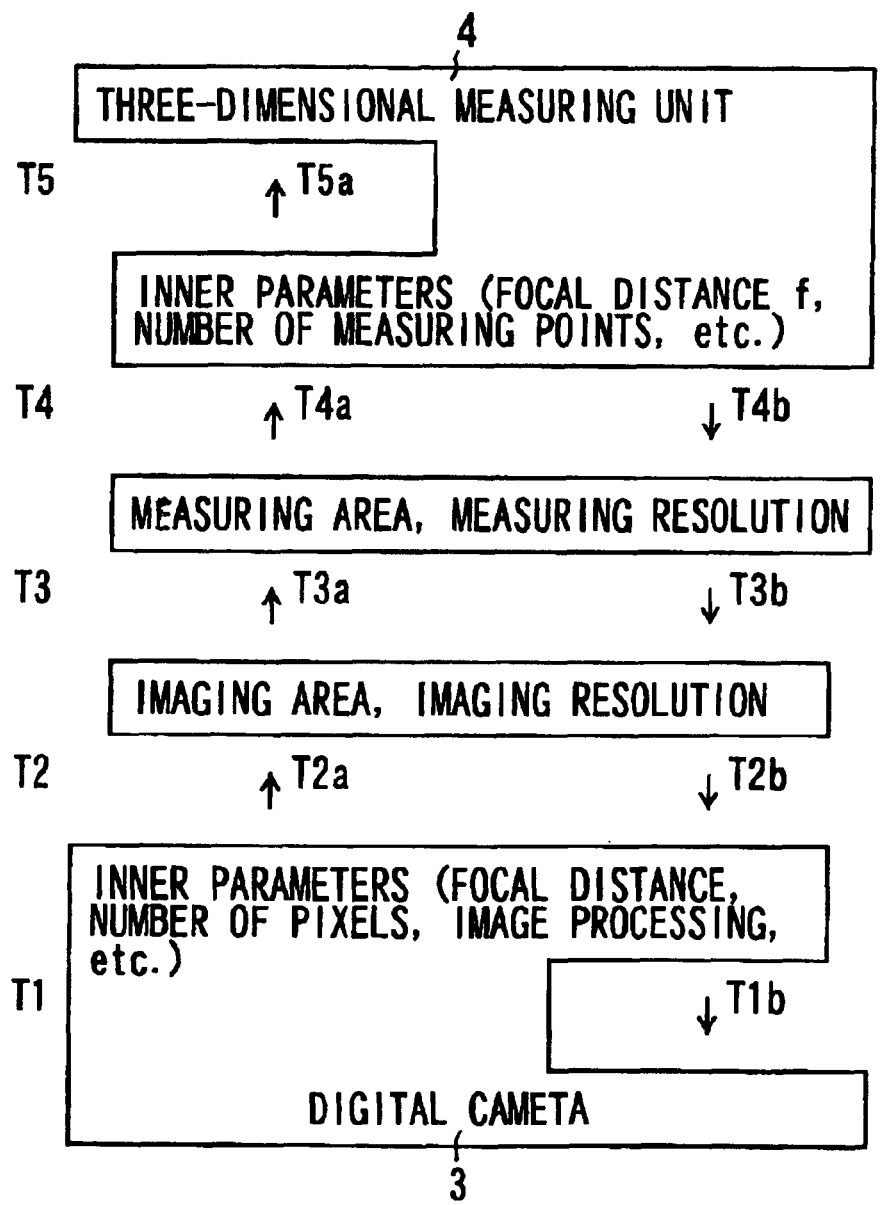
FIG. 10 is a diagram for explaining various levels concerning a communication method.

FIG. 10 is a diagram for explaining various levels T concerning a communication method between the digital camera 3 and the three-dimensional measuring unit 4.

As shown in FIG. 10, in the digital camera 3, inner parameters such as the focal distance f, the number of pixels and the magnification ratio in the image processing are determined or can be set in accordance with their structure. In the three-dimensional measuring unit 4, inner parameters such as the scan angle φ1 of the scanning mirror 37 and the number of the measuring points are determined or can be set in accordance with their structure. Among the inner parameters, there are intermediate parameters. There are various levels T1–T5 depending on which parameter is transmitted.

In addition, as a method of the communication, there are two methods: one is the method of transmitting the parameter from the digital camera 3 to the three-dimensional measuring unit 4; the other is the method of transmitting in the opposite direction. The former is indicated by adding a suffix "a" to the level T1–T5, and the latter is indicated by adding a suffix "b".

For example, in the level T2a, the inner parameters such as the focal distance f, the number of pixels and the magnification ratio are transmitted from the digital camera 3 to the three-dimensional measuring unit 4. After receiving the parameters, the three-dimensional measuring unit 4 sets own operating condition in accordance with the parameters.

In the level T3a, the digital camera 3 calculates its own photographing area and photographing resolution in accordance with the inner parameters including the focal distance f, the number of pixels and the magnification ratio, and transmits the calculated photographing area and photographing resolution to the three-dimensional measuring unit 4.

In the level T4a, the digital camera 3 calculates the measuring area and the measuring resolution of the three-dimensional measuring unit 4, and transmits the calculated measuring area and measuring resolution to the three-dimensional measuring unit 4.

In the level T5a, the digital camera 3 calculates the parameters including the scan angle φ1 and the number of the measuring points of the three-dimensional measuring unit 4, and transmits the calculated parameters to the three-dimensional measuring unit 4.

In the level T3b, for example, the three-dimensional measuring unit 4 calculates its own measuring area and measuring resolution in accordance with the inner parameters including the scan angle φ1 and the number of the measuring points, and transmits the calculated measuring area and measuring resolution to the digital camera 3.

The communication can be performed in any of the levels T. However, it is desirable to perform the communication in the level T3 for reducing the data quantity of the communication in the entire imaging system 1 and for general purpose.

FIGS. 11–19 are diagrams showing examples of an operating condition that is transmitted and received between the digital camera 3 and the three-dimensional measuring unit 4.

As shown in FIGS. 11–19, the operating condition that is transmitted from the digital camera 3 to the three-dimensional measuring unit 4 is denoted with "CA", and the operating condition that is transmitted from the three-dimensional measuring unit 4 to the digital camera 3 is denoted with "CB".

Furthermore, the processes including determination of the operating condition, acquiring, calculation for the acquiring, transmission and reception are executed by the two-dimensional controlling portion 20 of the digital camera 3 or by the three-dimensional controlling portion 40 of the three-dimensional measuring unit 4.

Figure 11:
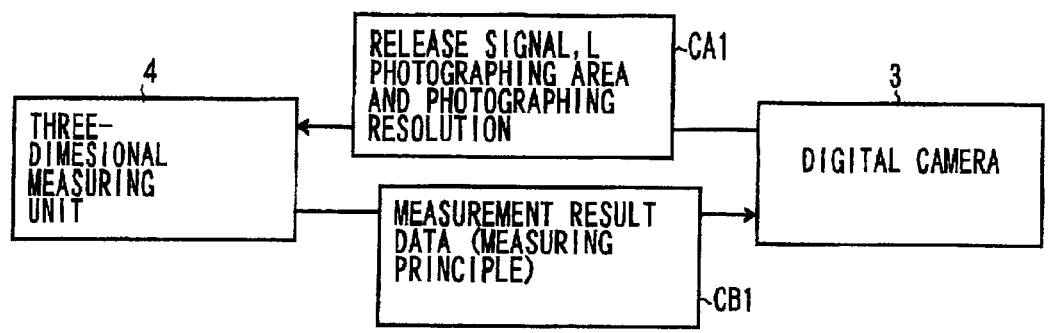
FIG. 11 is a diagram showing an example of an operating condition that is transmitted and received.

As shown in FIG. 11, the operating condition CA1 includes the release signal that is a photographing start signal of the digital camera 3, the photographing area, and the photographing resolution. The operating condition CB1 includes the measurement result data, and data indicating the measuring principle as necessity.

Figure 12:
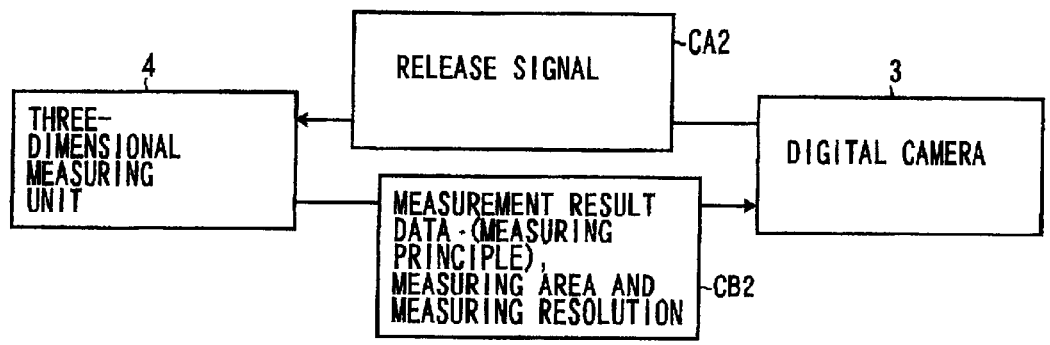
FIG. 12 is a diagram showing another example of an operating condition that is transmitted and received.

As shown in FIG. 12, the operating condition CA2 includes the release signal. The operating condition CB2 includes the measurement result data, data indicating the measuring principle as necessity, the measuring area, and the measuring resolution.

Figure 13:
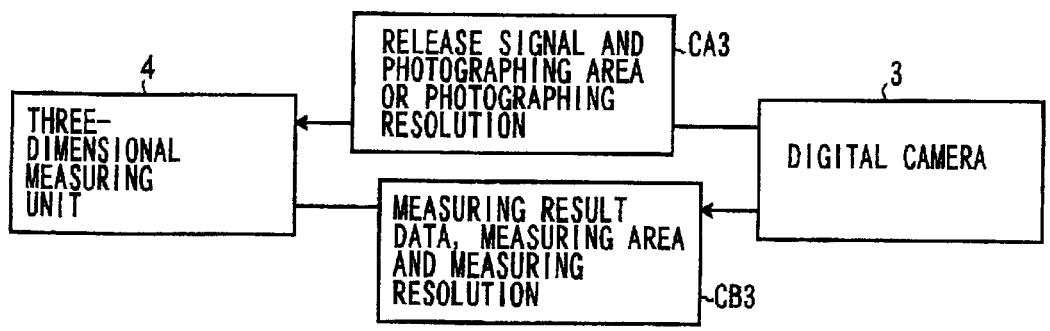
FIG. 13 is a diagram showing still another example of an operating condition that is transmitted and received.

As shown in FIG. 13, the operating condition CA3 is either the release signal and the photographing area, or the photographing resolution. The operating condition CB3 is any one of the measurement result data, the measuring area and the measuring resolution.

Figure 14:
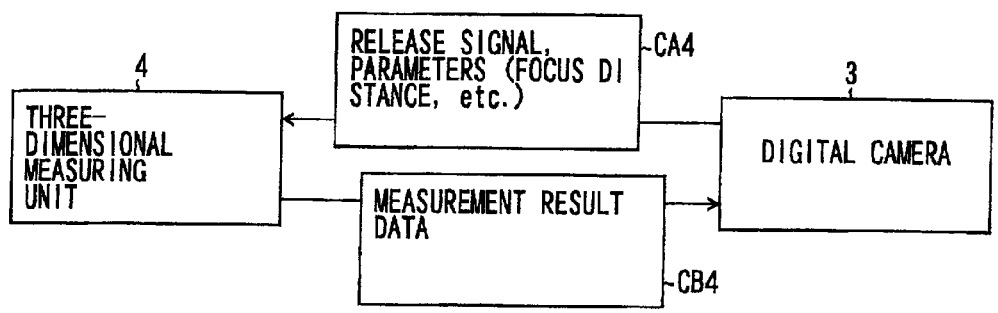
FIG. 14 is a diagram showing still another example of an operating condition that is transmitted and received.

As shown in FIG. 14, the operating condition CA4 is one or more parameters including the release signal and the focal distance. The operating condition CB4 is the measurement result data.

Figure 15:
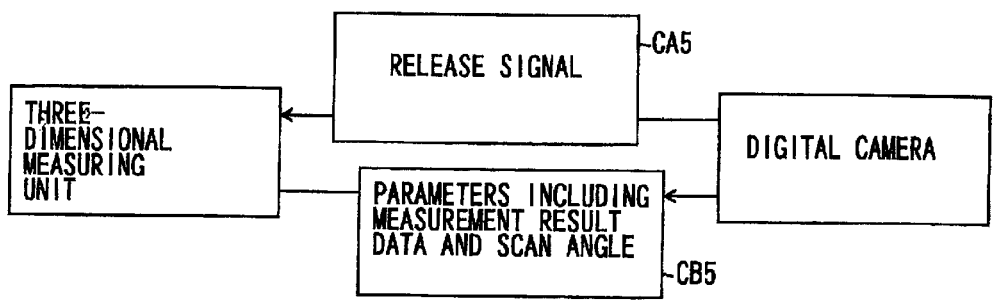
FIG. 15 is a diagram showing still another example of an operating condition that is transmitted and received.

As shown in FIG. 15, the operating condition CA5 is a release signal. The operating condition CB6 is a parameter including the measurement result data and the scan angle $\phi$ 1.

Figure 16:
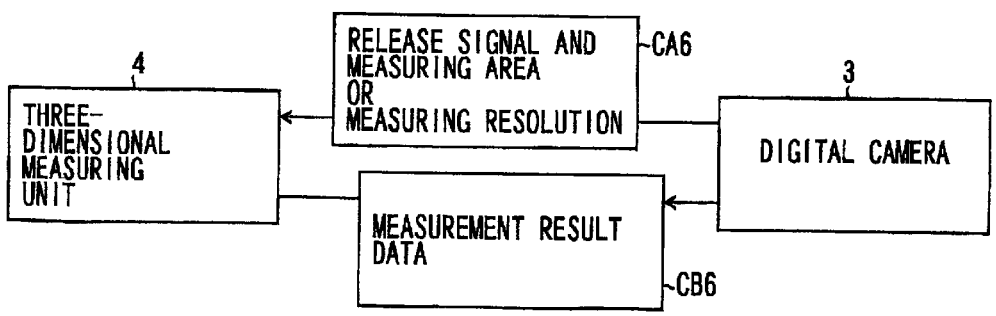
FIG. 16 is a diagram showing still another example of an operating condition that is transmitted and received.

As shown in FIG. 16, the operating condition CA6 is the release signal, and the measuring area or the measuring resolution. The operating condition CB6 is the measurement result data.

Figure 17:
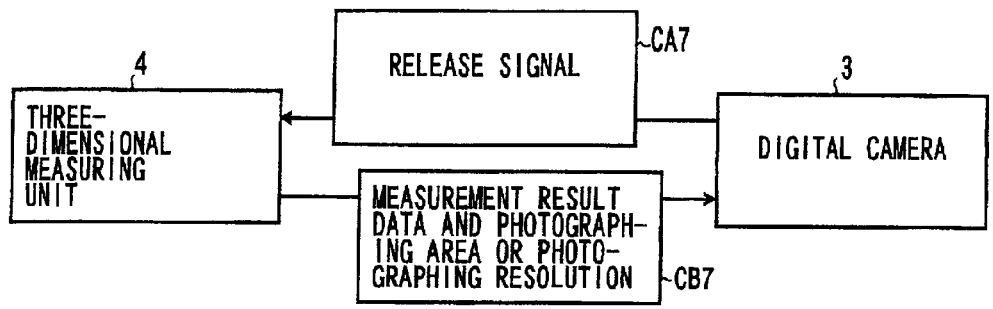
FIG. 17 is a diagram showing still another example of an operating condition that is transmitted and received.

As shown in FIG. 17, the operating condition CA7 is the release signal. The operating condition CB7 is the measurement result data, and the photographing area or the photographing resolution.

Figure 18:
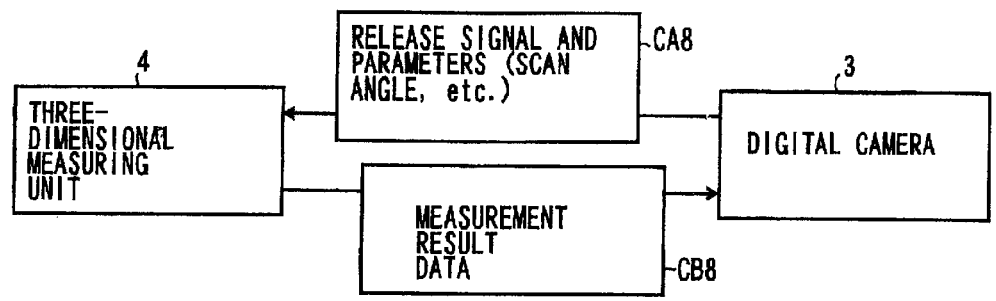
FIG. 18 is a diagram showing still another example of an operating condition that is transmitted and received.

As shown in FIG. 18, the operating condition CAB is parameters including the release signal and the scan angle $\phi$1. The operating condition CB8 is the measurement result data.

Figure 19:
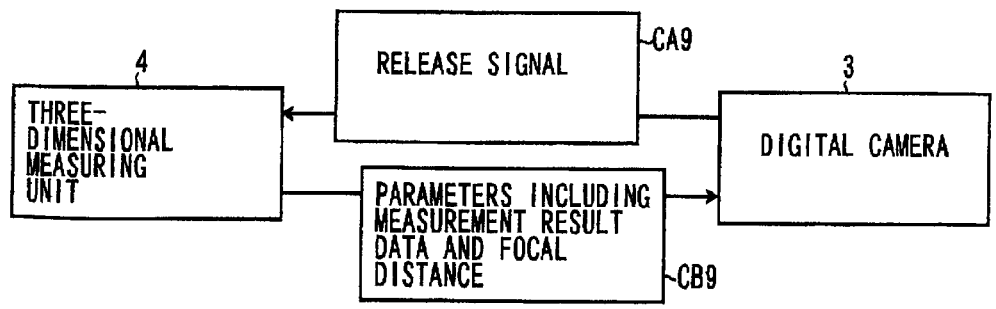
FIG. 19 is a diagram showing still another example of an operating condition that is transmitted and received.

As shown in FIG. 19, the operating condition CA9 is the release signal. The operating condition CB9 is parameters including the measurement result data and the focal distance f.

By selecting these operating conditions CA, CB, the above-mentioned level T is determined. By selecting the operating conditions CA, CB, the digital camera 3 and the three-dimensional measuring unit 4 have different loads of control, and the difference affects the cost.

For example, if the cost of the digital camera 3 is requested to be low, the operating conditions CA, CB are selected so that the load of the two-dimensional controlling portion 20 of the digital camera 3 becomes small. It is, for example, the operating condition in which the calculation quantity in the two-dimensional controlling portion 20 is reduced. On the contrary, if the cost of the three-dimensional measuring unit 4 that is an option is requested to be low, the operating conditions CA, CB are selected so that the load of the three-dimensional controlling portion 40 becomes small. It is, for example, the operating condition in which the calculation quantity in the three-dimensional controlling portion 40 is reduced.

Next, an operation of the imaging system 1 will be explained with reference to following screen pictures displayed on the display portion 18 and a flowchart.

Several examples are considered corresponding to a measuring method of the three-dimensional measuring unit 4, a reference operating condition and levels T of the communication.

In a first example, the three-dimensional measuring unit 4 uses the TOF method shown in FIG. 2, the operating condition CA of the digital camera 3 is the reference operating condition, and the communication level is the level T3a.

In a second example, the three-dimensional measuring unit 4 uses the TOF method shown in FIG. 2, the operating condition CB of the three-dimensional measuring unit 4 is the reference operating condition, and the communication level is the level T3b.

In a third example, the three-dimensional measuring unit 4 uses the light section method shown in FIG. 3, the operating condition CA of the digital camera 3 is the reference operating condition, and the communication level is the level T3a.

In a fourth example, the three-dimensional measuring unit 4 uses the light section method shown in FIG. 3, the operating condition CB of the three-dimensional measuring unit 4 is the reference operating condition, and the communication level is the level T3b.

FIRST AND THIRD EXAMPLES

Figure 20:
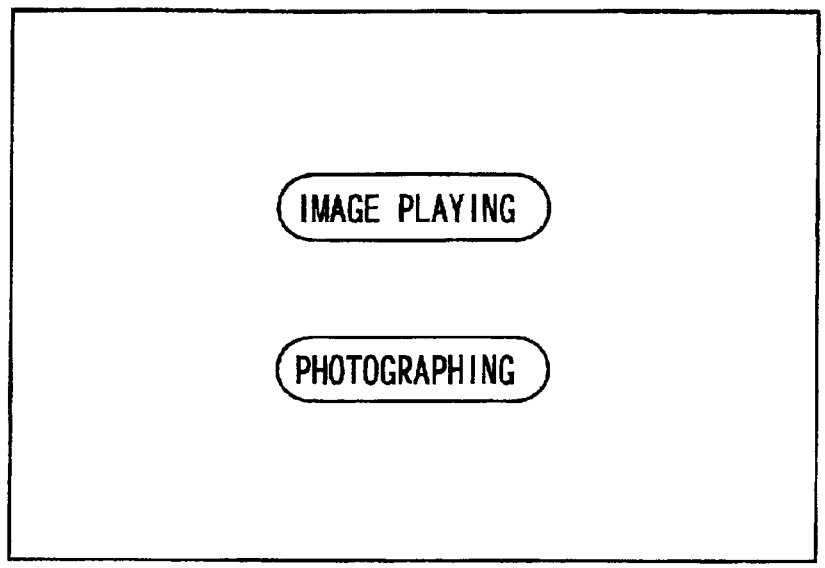
FIG. 20 is a diagram showing an example of a menu screen.
Figure 21:
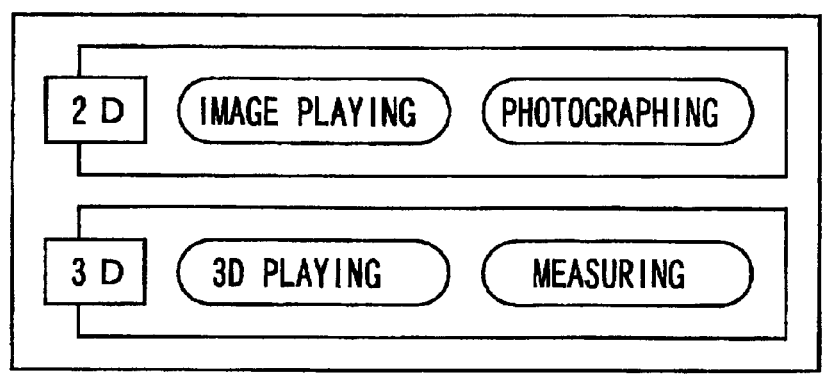
FIG. 21 is a diagram showing another example of a menu screen.
Figure 22:
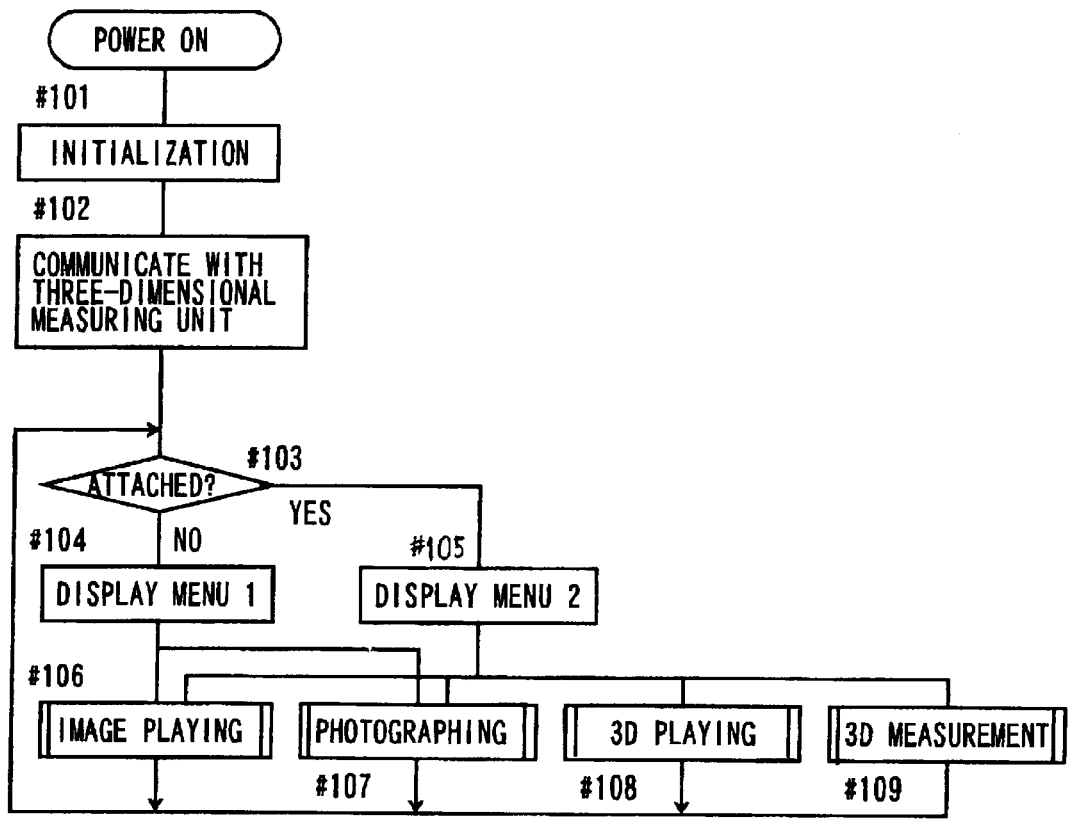
FIG. 22 is a main flowchart showing a control process of the digital camera.
Figure 24:
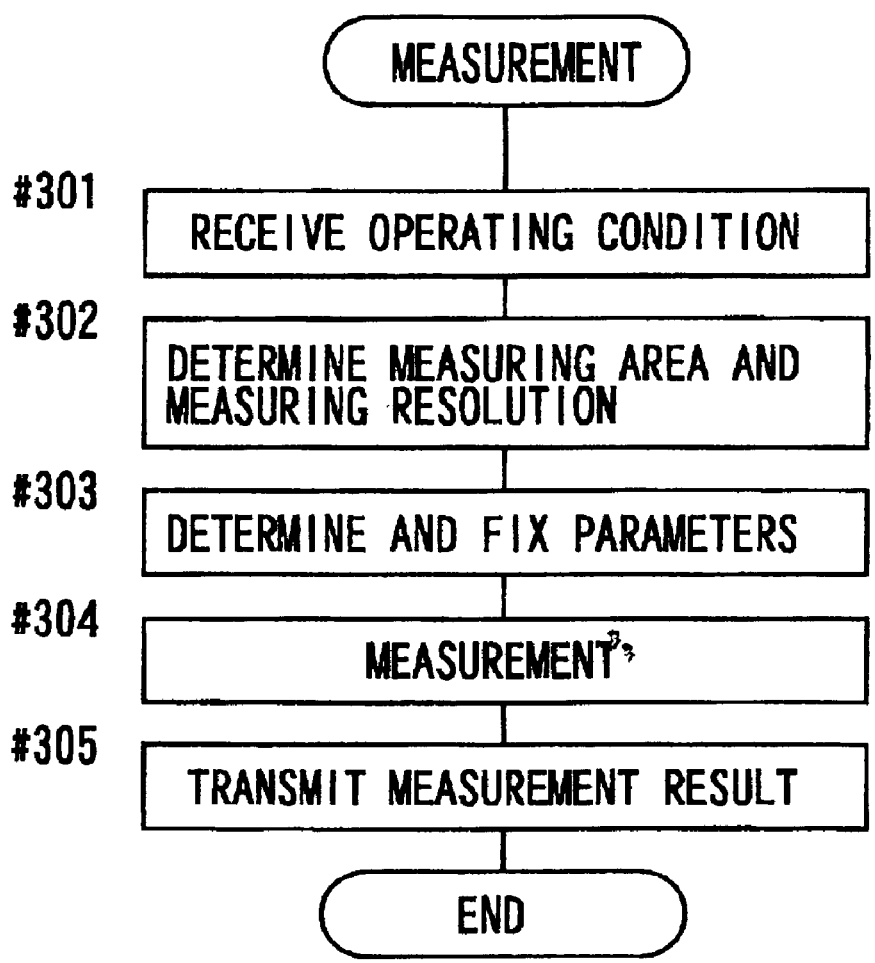
FIG. 24 is a flowchart showing a measuring process of the three-dimensional measuring unit.

FIG. 20 is a diagram showing an example of a menu screen HG1. FIG. 21 is a diagram showing another example of a menu screen HG2. FIG. 22 is a main flowchart showing a control process of the two-dimensional controlling portion 20 of the digital camera 3. FIG. 23 is a flowchart showing a routine of three-dimensional process of the digital camera 3. FIG. 24 is a flowchart showing a measuring process of the three-dimensional measuring unit 4.

In the first and the third example, the operating condition CA of the digital camera 3 is used as a reference for setting the operating condition CB of the three-dimensional measuring unit 4. In this case, the capturing areas EP, EM are set in the relationship as shown in FIG. 7.

As shown in FIG. 22, each portion is initialized, and power supply to the three-dimensional measuring unit 4 is started (#101). Next, it is checked whether the three-dimensional measuring unit 4 is attached (#102). For example, a predetermined signal as transmitted to the three-dimensional controlling portion 40, and it is checked whether a response is received in a predetermined time. After the checking, specification information is exchanged with each other.

It is possible to provide a switch or a sensor that responds to the attached or removed state of the three-dimensional measuring unit 4 and to detect the state of the switch or the sensor. However, the check by the communication with the three-dimensional controlling portion 40 is more reliable.

Depending on whether the three-dimensional measuring unit 4 is attached or not (#103), the menu screen HG1 or HG2 is displayed on the display portion 18.

As shown in FIG. 20, the menu screen HG1 is an initial menu when the three-dimensional measuring unit 4 is not attached, and only a mode concerning the two-dimensional photographing is displayed (#104).

As shown in FIG. 21, the menu screen HG2 is an initial menu when the three-dimensional measuring unit 4 is attached, and a mode concerning the three-dimensional measuring is displayed along with the mode that is displayed in the menu screen HG1 (#105).

In these screens HG1, HG2, the vertical and horizontal direction buttons of the operating portion 17 are operated for selecting a mode, and the confirming button of the operating portion 17 is operated for selecting the mode actually. Next, each mode will be explained.

In an image playing mode, a recorded two-dimensional image is read out and is displayed in the display portion 18. It is possible to change the image to be displayed and to erase the currently displayed image.

In a photographing mode, the two-dimensional image is photographed in the same way as a normal digital camera.

In a three-dimensional playing mode, the recorded three-dimensional data and the measurement result data are read out and are displayed in the display portion 18. For example, the distance can be converted into a light and shade display. In addition, the display of three-dimensional data can be tiled or overlapped with the display of the corresponding two-dimensional image.

In a measuring mode, the three-dimensional measuring is performed for a part or a whole of the screen displayed in the finder using the three-dimensional measuring unit 4.

Then, in accordance with the mode that was selected in the menu screens HG1, HG2, the process goes to a routine of each mode (#106–109).

After finishing this process routine, the process returns to the step of displaying the menu screens HG1, HG2.

As shown In FIG. 23, in the three-dimensional process the digital camera 3 performs the photographing of a subject (an object), and the photographed two-dimensional image is displayed in the finder of the display portion 18 (#201). The photographing is repeated and the display is updated so as to make a moving picture display. A user can view the finder display for setting the measuring area.

The image that is displayed in the display portion 18 is the photographed two-dimensional image, and the focus adjustment is performed in accordance with the measurement result data that were measured by the three-dimensional measuring unit 4 in this embodiment. It is because that the accuracy is higher than that of the distance measuring portion 16 of the digital camera 3.

When the zooming button (TELE or WIDE) of the operating portion 17 is operated (#202), a control signal is transmitted to the lens controlling portion 14 in accordance with the direction for zooming control (#203).

The operation of the release button is checked. If the operation is not done (No in #204), the process returns to Step #201 for updating the finder image.

If the operation of the release button is done (Yes in #204), the photographing area EP and the photographing resolution are determined from each photographing parameter of the digital camera 3 (#205).

The photographing area BP is determined in accordance with the direction of the optical axis of the digital camera 3, dimensions of the area sensor 11, and the focal distance f of the group of lenses 13. If the digital camera 3 has a zooming function, it is a focal distance that is the revised result of the rezooming operation. If the zooming function is not provided, it is determined from the fixed focal distance f. Furthermore, if the digital camera 3 has an electronic zooming function, the photographing area EP is determined with reference to the magnification of the electronic zooming. The photographing resolution is determined by the number of pixels of the area sensor 11.

Then, the information indicating the operating condition CA is transmitted from the digital camera 3 to the three-dimensional measuring unit 4 (#206). In this example, the operating condition CA is a release signal (a measurement start signal), a photographing area EP, and a photographing resolution.

Next, photographing of the two-dimensional image is performed (#207). The photographed two-dimensional image is recorded in Step #211 afterward corresponding to the three-dimensional data. In addition, the two-dimensional image is used in Step #209 as mentioned above, or used in the three-dimensional playing mode for displaying with the three-dimensional data.

When the release signal is transmitted to the three-dimensional measuring unit 4 in Step #206, the three-dimensional controlling portion 40 of the three-dimensional measuring unit 4 controls to perform the measurement, and the measurement result is inputted to the digital camera 3 (#208).

Then, the inputted measurement result is displayed in the display portion 18 (#209). Simultaneously, the two-dimensional image that is photographed in Step #207 is displayed with being tiled or overlapped. Thus, the subject of the measurement can be confirmed.

It is possible to display a measurement point on the two-dimensional image. The result of the three-dimensional measurement, i.e., the three-dimensional data are displayed as an image in which the distance is expressed as light and shade.

Then, an "OK" button and a "Cancel" button are displayed in the screen of the display portion 18 for waiting an input by the user (#210).

The user views the display and operates the vertical and horizontal buttons and the confirming button so as to input "OK" or "Cancel". If the user inputs "OK", the measurement result is recorded (#211). At the same time, the two-dimensional image, the coordinates of the measuring point, the operating condition of the three-dimensional measuring unit 4 that was used, other specifications and bibliographic items such as a date and an operator are recorded corresponding to the measurement result.

The user is inquired about the intention of either returning to the main menu or continuing the measurement (#212). If the intention of returning to the main menu is inputted, the process returns to the menu screen HG2. If the intention of continuing the measurement is inputted, the process returns to Step #201.

The measuring process as shown in FIG. 24 is performed when the three-dimensional measuring unit 4 receives the release signal from the digital camera 3.

First, the information of the operating condition CA that is transmitted in Step #206 is received (#301). In accordance with the received photographing area and photographing resolution, the measuring area and the measuring resolution of the three-dimensional measuring unit 4 are determined (#302). Then, the measuring area and the measuring resolution are determined in accordance with the relationship shown in FIG. 7.

Next, parameters of the portions of the three-dimensional measuring unit 4 are determined and fixed (#303). In accordance with the fixed measuring area and the measuring time interval, the parameters of the following portions are determined and set.

In the first example, as the measuring area, a reference direction of the measurement and the scanning angle of the scanning mirror 37 are set. As the measuring resolution, a scanning speed of the scanning mirror 37, a laser projection time interval of the light projection portion 31 that is a measuring time interval, and a light emission number that is a measuring point number are set.

In the third example, a measuring reference direction, a scanning angle of the scanning mirror 37, a scanning speed and a focal distance (zooming steps) of the group of lenses 38 are determined as the measuring area. As the measuring resolution, a scanning speed of the scanning mirror 37, a data fetch time interval from the area sensor 32 that is a measuring time interval (in the case of the first type), the number of vertical and horizontal pixels of the process area sensor 32a or the number acquired by the interpolation process (in the case of the second type), and the number of fetching data from the area sensor 32a that is the measuring point number are set.

For the set measuring point, the measurement is performed (#304), and the measurement result is transmitted to the digital camera 3 (#305).

In the first and the third example, the digital camera 3 can determine the operating condition CA without depending on the specification of the three-dimensional measuring unit 4.

SECOND AND FOURTH EXAMPLES

Figure 25:
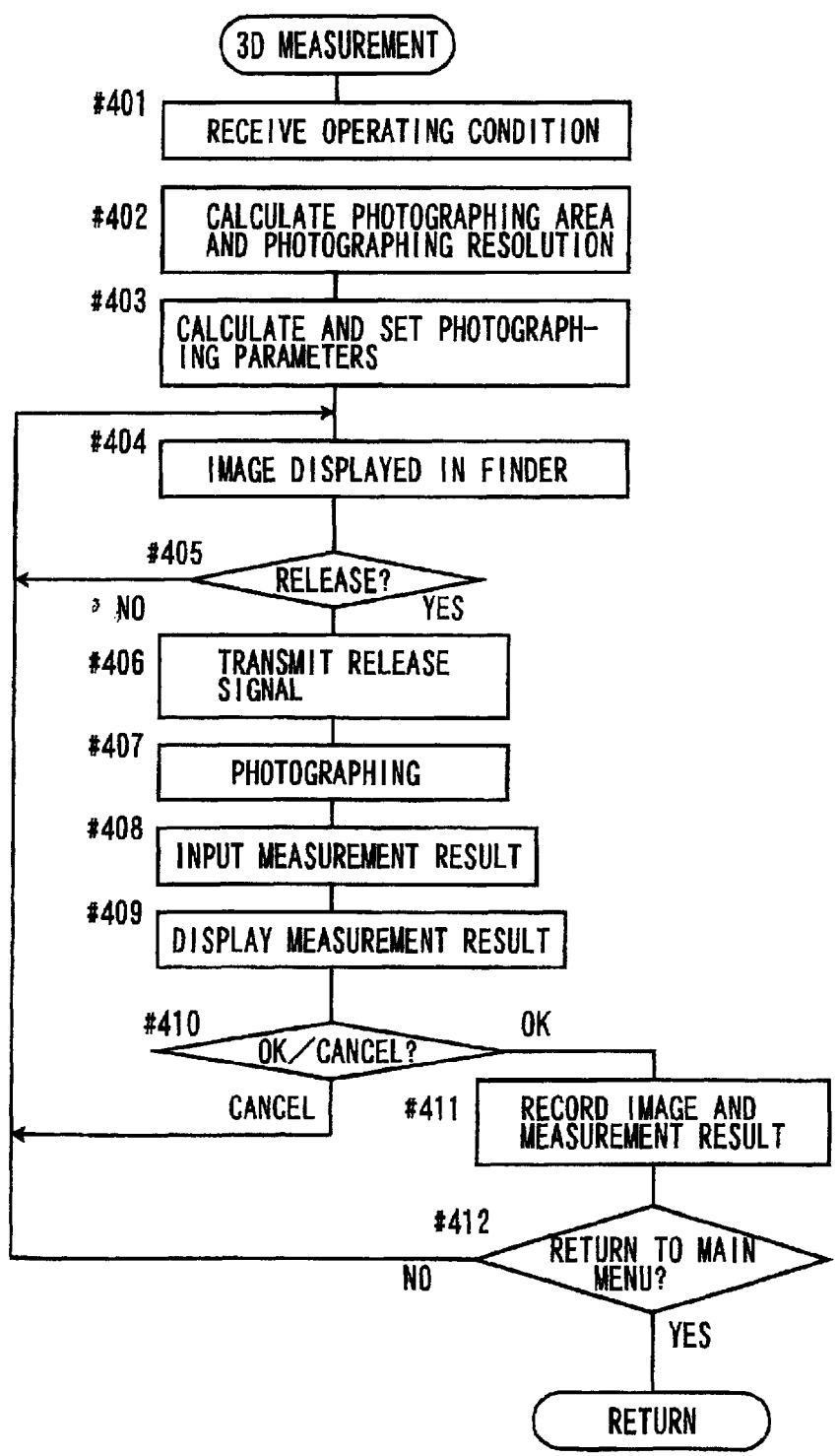
FIG. 25 is a flowchart showing a routine of three-dimensional process of the digital camera.
Figure 26:
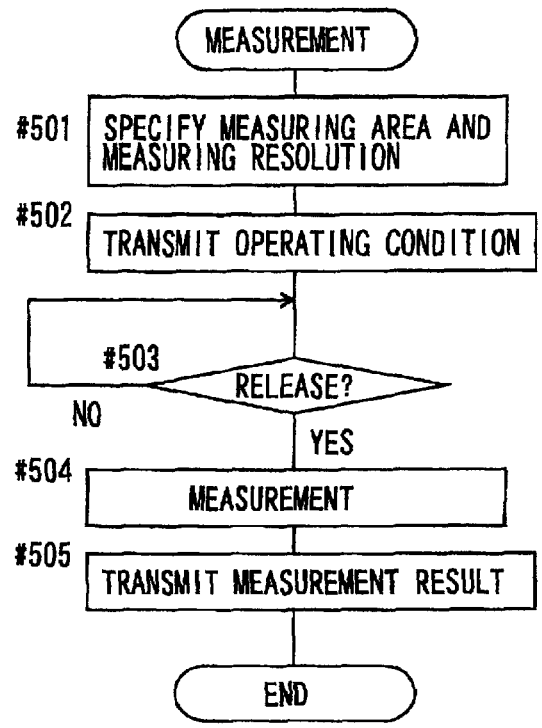
FIG. 26 is a flowchart showing a measuring process of the three-dimensional measuring unit.

FIG. 25 is a flowchart showing a routine of the three-dimensional process in the,digital camera 3. FIG. 26 is a flowchart showing a measuring process in the three-dimensional measuring unit 4.

In the second and the fourth example, the operating condition CB of the three-dimensional measuring unit 4 is used as a reference for determining the operating condition CA of the digital camera 3. On this occasion, the capturing areas EP, EM are set in the relationship as shown in FIG. 8. The main flowchart is the same as that shown in FIG. 22. If the measuring mode is selected in the menu screen HG2, the flowchart shown in FIG. 25 is performed.

In FIG. 25, information of the operating condition CB that is transmitted from the three-dimensional measuring unit 4, i.e., information showing the measuring area and the measuring resolution is received (#401).

The information indicating the measuring area is as follows.

In the second example, it includes the measuring reference direction, the measurable minimum distance Zmin and the maximum Zmax, and the scanning angle φ1. In the fourth example, it includes the measuring reference direction, the distance Zref to the reference position and the distance area ΔZ, and the scanning angle φ1.

The information indicating the measuring resolution is as follows.

In the second example, it is the number of the measuring points in the vertical and the horizontal directions. In the fourth example, it is the data fetch time interval from the area sensor 32$a$ (in the case of the first type), or the number of pixels in the vertical and the horizontal direction of the area sensor 32$a$ or the number of pixels obtained by the interpolation process (in the case of the second type).

In accordance with the received operating condition CB, the photographing area and the photographing resolution of the digital camera 3 are calculated from the relationship shown in FIG. 8 (#402).

In accordance with the calculated photographing area and photographing resolution, photographing parameters in the image processing of the digital camera 3 such as a resolution conversion process and the focal distance f of the group of lenses 13 are calculated and set (#403).

Step #404 and Step #405 are the same as Step #201 and Step 204 shown in FIG. 23. In Step #406, when the release operation is performed, the release signal is transmitted to the three-dimensional measuring unit 4. Step #407 through Step #412 are the same as Step #206 through Step #211 shown in FIG. 23.

The measuring process shown in FIG. 26 is performed when the three-dimensional measuring unit 4 receives the release signal from the digital camera 3.

The measuring area and the measuring resolution of the three-dimensional measuring unit 4 are specified in accordance with parameters of the portions (#501). As the operating condition CB of the three-dimensional measuring unit 4, information indicating the measuring area and the measuring resolution is transmitted to the digital camera 3 (#502). The information to be transmitted is the same as the information that is received in Step #401.

In the second and the fourth examples, the three-dimensional measuring unit 4 can determine the operating condition CB without depending on a specification of the digital camera 3.

Next, variations (1)–(10) of the above-mentioned first through fourth examples will be explained. (1) The photographing area BP and the photographing resolution of the digital camera 3 and the measuring resolution of the three-dimensional measuring unit 4 are fixed. Only the measuring area KM of the three-dimensional measuring unit 4 is variable.

In this case, the photographing area EP of the digital camera 3 is communicated, and the resolution is not communicated. The measuring area EM of the three-dimensional measuring unit 4 is set responding to the photographing area EP of the digital camera 3.

In this case, In Step #205 of the above-mentioned flowchart, when the release operation is done, the photographing area EP is specified in accordance with the photographing parameters of the digital camera 3. In Step #206, when the release operation is done, information indicating the photographing area BP of the digital camera 3 is transmitted to the three-dimensional measuring unit 4 along with the release signal.

In Step #301, the photographing area EP that is transmitted along with the release signal is received. In Step #302, the parameters of the portions of the three-dimensional measuring unit 4 are determined and set. In accordance with the received information of the photographing area EP, the measuring area EM is determined from the relationship shown in FIG. 7. In Step #303, in accordance with the determined measuring area EM, the parameters concerning the measuring area EM of the three-dimensional measuring unit 4 are determined and set. Other parameters are set to predetermined values. (2) Only the photographing area EP of the digital camera 3 is variable. The resolution of the digital camera 3 and the measuring area EM and the resolution of the three-dimensional measuring unit 4 are fixed.

The measuring area EM of the three-dimensional measuring unit 4 is communicated, and the resolution is not communicated. The photographing area EP of the digital camera 3 is set responding to the measuring area EM of the three-dimensional measuring unit 4.

In this case, in Step #401, the measuring area EM that is transmitted from the three-dimensional measuring unit 4 is received. In Step #402, in accordance with the received measuring area EM, the photographing area EP of the digital camera 3 is calculated from the relationship shown in FIG. 8. In Step #403, in accordance with the determined photographing area EP, the parameters concerning the photographing area EP, such as the focal distance f of the photographing lens (group of lenses 13) are determined and set. Other parameters are set to predetermined values.

In Step #501, the measuring area EM is determined from the parameters of the three-dimensional measuring unit 4. In Step #502, the information of the measuring area EM is transmitted to the digital camera 3. (3) As a variation of the variation (1), only the photographing resolution is communicated for the operating condition, and the photographing area is ndt communicated. In this case, for example, the photographing resolution is specified in Step #205, and the release signal and the photographing resolution are transmitted in Step #206. In addition, the photographing resolution is received in Step #301, and the measuring resolution is calculated in Step #302. (4) As a variation of the variation (2), only the photographing resolution is communicated for the operating condition, and the photographing area is not communicated. In this case, for example, only the measuring resolution is received in Step #401, and the photographing resolution is calculated in Step #402. The measuring resolution is specified in Step #501, and the measuring resolution is transmitted in Step #502. (5) The information that is transmitted from the digital camera 3 to the three-dimensional measuring unit 4 is a parameter that is necessary for specifying at least one of the photographing area EP and the photographing resolution, and at least one of the photographing area EP of the digital camera 3 and the photographing resolution can be specified in the three-dimensional measuring unit 4.

In this case, for example, Step #205 is omitted, and the photographing parameter is transmitted in Step #206 as the operating condition. In addition, the photographing parameter is received as the operating condition in Step #301, and at least one of the photographing area EP and the photographing resolution is specified in accordance with the parameter. (6) The information that is transmitted from the three-dimensional measuring unit 4 to the digital camera 3 is a parameter that is necessary for specifying at least one of the measuring area EM and the measuring resolution, and at least one of the measuring area EM and the measuring resolution of the three-dimensional measuring unit 4 can be specified in the digital camera 3.

In this case, for example, the photographing parameter is received as the operating condition in Step #401, at least one of the measuring area EM and the measuring resolution is specified in Step #402 in accordance with the parameter, and the photographing resolution is calculated. In addition, Step #501 is omitted, and the measuring parameter is transmitted as the operating condition in Step #502. (7) The digital camera 3 calculates at least one of the measuring area EM and the measuring resolution, and the information that is transmitted from the digital camera 3 to the three-dimensional measuring unit 4 can be at least one of the measuring area EM and the measuring resolution.

In this case, for example, the measuring area EM and the measuring resolution are calculated in Step #205 from the specified photographing area EP and the photographing resolution, and calculated measuring area EM and the measuring resolution are transmitted in Step #206 as the operating condition. Furthermore, the measuring area EM and the measuring resolution are received in Step #301, and Step #302 is omitted. (8) In the three-dimensional measuring unit 4, at least one of the photographing area EP and the photographing resolution is specified, and the information that is transmitted from the three-dimensional measuring unit 4 to the digital camera 3 can be at least one of the photographing area EP and the photographing resolution.

In this case, for example, the photographing area EP and the photographing resolution are received in Step #401 as the operating condition, and the Step #402 can be omitted. Furthermore, the photographing area EP and the photographing resolution are calculated from the specified measuring area EM and the measuring resolution in Step #501, and the calculated photographing area EP and the photographing resolution are transmitted in Step #502 as the operating condition. (9) In the digital camera 3, at least one of the measuring area EM and the measuring resolution is specified, and the information that is transmitted from the digital camera 3 to the three-dimensional measuring unit 4 can be parameters obtained from at least one of the measuring area EM and the measuring resolution.

In this case, for example, the measuring area EM and the measuring resolution are calculated from the specified photographing area EP and the photographing resolution in Step #205, and the measuring parameter is calculated therefrom. In Step #206, the calculated measuring parameter is transmitted as the operating condition. Furthermore, the measuring parameter is received in Step #301 as the operating condition, and Step #302 is omitted. (10) In the three-dimensional measuring unit 4, at least one of the photographing area EP and the photographing resolution id specified, and the information that is transmitted from the three-dimensional measuring unit 4 to the digital camera 3 can be parameters obtained from at least one of the photographing area EP and the photographing resolution.

In this case, for example, the photographing parameter is received in Step #401 as the operating condition, and Step #402 is omitted. Furthermore, the photographing area EP and the photographing resolution are calculated in Step #501 from the specified measuring area EM and the measuring resolution, and the photographing parameter is calculated therefrom. In Step #502, the calculated photographing parameter is transmitted as the operating condition.

In the above-mentioned variations, if a part of the operating condition is fixed, the information to be transmitted can be reduced, so that the communication can be performed in high speed and that the cost can be reduced.

In addition, concerning the level T of the communication shown in FIG. 10, the variations (1) and (3) use the level T3$a$, the variations (2) and (4) use the level T3$b$, the variation (5) uses the level T2$a$, the variation (6) uses the level T4$b$, the variation (7) uses the level T4$a$, the variation (8) uses the level T2$b$, the variation (9) uses the level T5$a$, and the variation (10) uses the level T1$b$.

Still, other variations (11)–(17) will be explained. (11) It is possible to provide an operating portion to the three-dimensional measuring unit 4, so that release of the three-dimensional measuring unit 4 is performed in the three-dimensional measuring unit 4. (12) It is possible to provide the memory portion to the three-dimensional measuring unit 4, so as to memorize the measurement result data in the memory portion. (13) The measuring principle of the three-dimensional measuring unit 4 can be other than the TOF method of the light-section method. For example, it can be a pattern projection method or a stereo photographing method. (14) In digital camera 3, when recording the three-dimensional data and the two-dimensional image in the recording portion 15, one or more of the measuring area EM, the measuring resolution, the photographing area BP, and the photographing resolution are recorded. When the two-dimensional image and the three-dimensional data are pasted to each other in an operation device (not shown), the information that is recorded in the recording portion 15 is used. (15) In accordance with the measuring area EM that is transmitted from the three-dimensional measuring unit 4, the measuring area EM is displayed on the two-dimensional image in the display portion 18 of the digital camera 3. (16) In accordance with the measurement result that is transmitted from the three-dimensional measuring unit 4, the measurement result data are displayed on the two-dimensional image in the display portion 18 of the digital camera 3. (17) The measuring area EM designated in the operating portion 17 and the display portion 18 of the digital camera 3 is transmitted to the three-dimensional measuring unit 4, and the designated measuring area EM is used for measuring.

In the above-mentioned variations (15)–(17), the three-dimensional measuring unit 4 and the digital camera 3 can be integrated. Furthermore, the above-mentioned variations can be combined with each other appropriately.

Next, the method of displaying the measuring area EM in the three-dimensional measuring unit 4 and the method of changing the measuring area EM will be explained.

Figure 27:
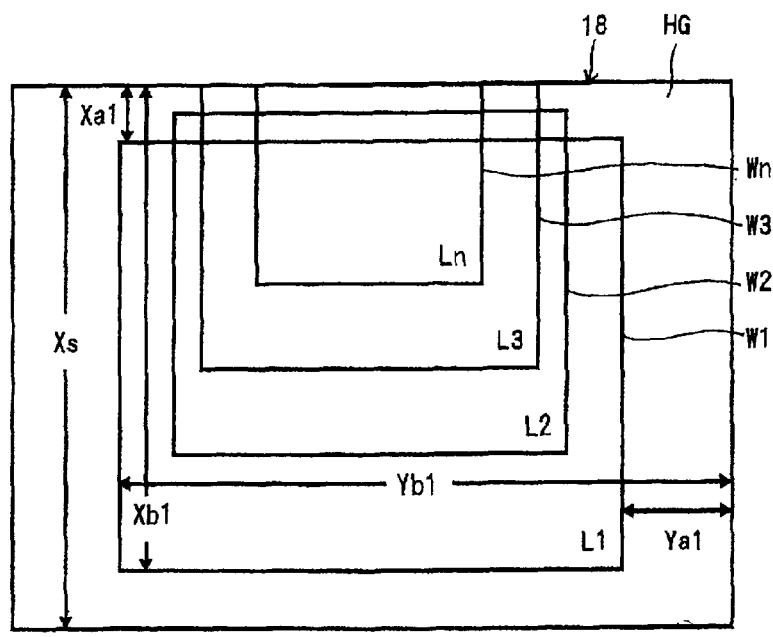
FIG. 27 is a diagram showing a display state of an area frame in the display portion.
Figure 28:
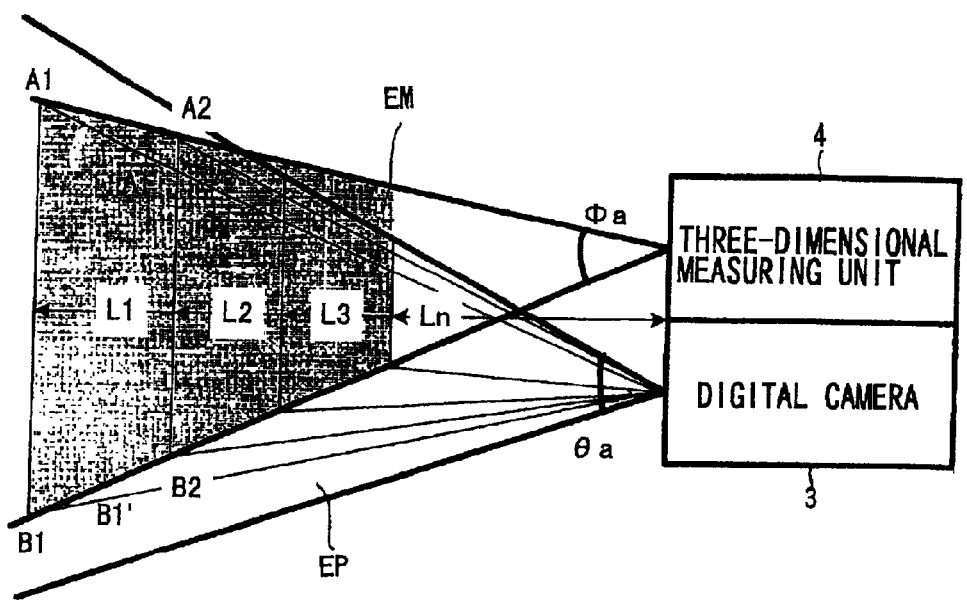
FIG. 28 is a diagram showing a principle for calculating a size of the area frame.
Figure 29:
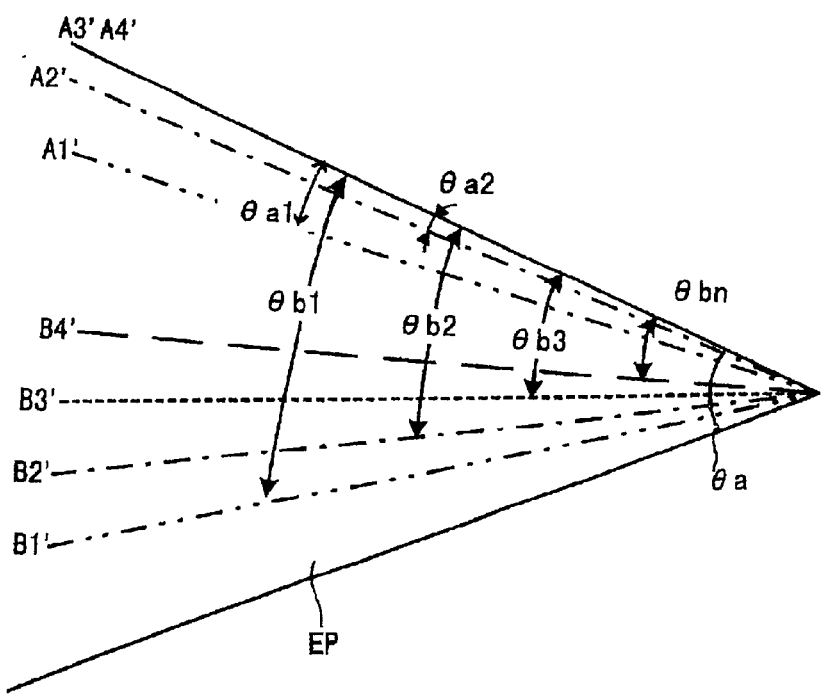
FIG. 29 is a diagram showing a principle for calculating a size of the area frame.

FIG. 27 is a diagram showing a display state of an area frame W in the display portion 18. FIGS. 28 and 29 are diagrams showing a principle for calculating a size of the area frame W.

In FIG. 27, plural area frames W1–Wn are displayed on the screen HG of the display portion 18 of the digital camera 3. These area frames W1–Wn indicate the measuring area EM for each distance L1–Ln in the Z-axis direction (the depth direction) on the lower right portion of each area frame W, numerical value as the distance L is displayed.

On the screen HG, the two-dimensional image that is photographed by the digital camera 3 is displayed fully in the screen. The vertical dimension of the screen HG, i.e., the distance between the upper edge and the lower edge is denoted with Xs.

The upper side of each area frame W is at the position separated from the upper edge of the screen HG by the distance Xa, and the lower side is at the position separated from the upper edge by the distance Xb. The right side of each area frame W is at the position separated from the right edge of the screen HG by the distance Ya, and the left side is at the position separated from the right edge by the distance Yb.

In FIG. 28, the photographing area EP of the digital camera 3 and the measuring area EM of the three-dimensional measuring unit 4 are shown. The photographing area EP is indicated with the angle of view θa, and the measuring area EM is indicated with the scanning angle 4a.

Each of the distances L1–Ln is a distance from the fiducial point of the imaging system 1. The maximum distance L1 corresponds to the maximum distance Zmax shown in FIG. 5, and the minimum distance Ln corresponds to the minimum distance Zmin shown in FIG. 5.

First, the overlapping portion of the photographing area EP and the measuring area EM is noted. Each of points A1, B1 at the ends of the overlapping portion in the maximum distance L1 is connected with the fiducial point of the angle of view θ1 of the digital camera 3, i.e., the principal point of the group of lenses 13 (the front principal point) with a line A1' or B1'. The area between the two lines A1' and B1' is the measuring area EM in the photographing area EP at the distance L1.

In the same way, points A2, B2, ... and lines A2', B2', ... are determined for distances L2, L3, ... , Ln. The lines are shown in FIG. 29.

In FIG. 29, the lines A1', B1', ... that were determined as explained above are shown for the photographing area EP of the digital camera 3. Angles between the upper end line of the photographing area EP and the lines A1', B1', A2', B2', ... , An', Bn' are θa1, θb1, θa2, θb2, ... , θan, θbn.

Such lines are determined not only for the vertical direction but also for the horizontal direction.

The distances L1–Ln, the angles θa1–θan and the angles θb1–θbn are represented by the distance Lm, the angle θam and the angle θbm, respectively. The letter "m" is an integer 1–n.

Using the angles θam and θbm, the lengths Xam and Xbm in the vertical direction shown in FIG. 27 are derived as follows.

$$Xam = Xs \times (\theta am/\theta a)$$

$$Xbm = Xs \times (\theta bm/\theta a)$$

Here, m is an integer 1–n.

In the same way, lengths Yam and Ybm in the horizontal direction are obtained. In accordance with the obtained lengths Xam, Xbm, Yam and Ybm, the area frame W is displayed on the screen HG. Each of the lengths is converted into an address or the number of pixels on the screen HG as necessity for controlling the display.

In the above-mentioned example, a linear area frame W is displayed on the screen HG. Instead, the two-dimensional image that was photographed by the digital camera 3 can be displayed with different light and shades for different area frames W without displaying the area frame W.

In addition, in accordance with the result of the preliminary measurement of the three-dimensional measuring unit 4, or with the measurement result of the digital camera 3 for the distance measuring portion 16, the area frame W or the light and shade image instead of the area frame W for only the distance where the subject exists or the vicinity of the distance (i.e., only for the distance with a right focus of the digital camera 3) can be displayed.

In this way, by displaying the area frame W or the light and shade image instead thereof, a user can easily know the area where the three-dimensional measuring unit 4 can measure. Therefore, using the imaging system 1, desired three-dimensional data and two-dimensional image can be acquired easily.

The above-mentioned area frame W is determined in accordance with the photographing area EP and the measuring area EM that is set as a default value in the imaging system 1. In the imaging system 1, a user can change the measuring area EM.

Figure 30:
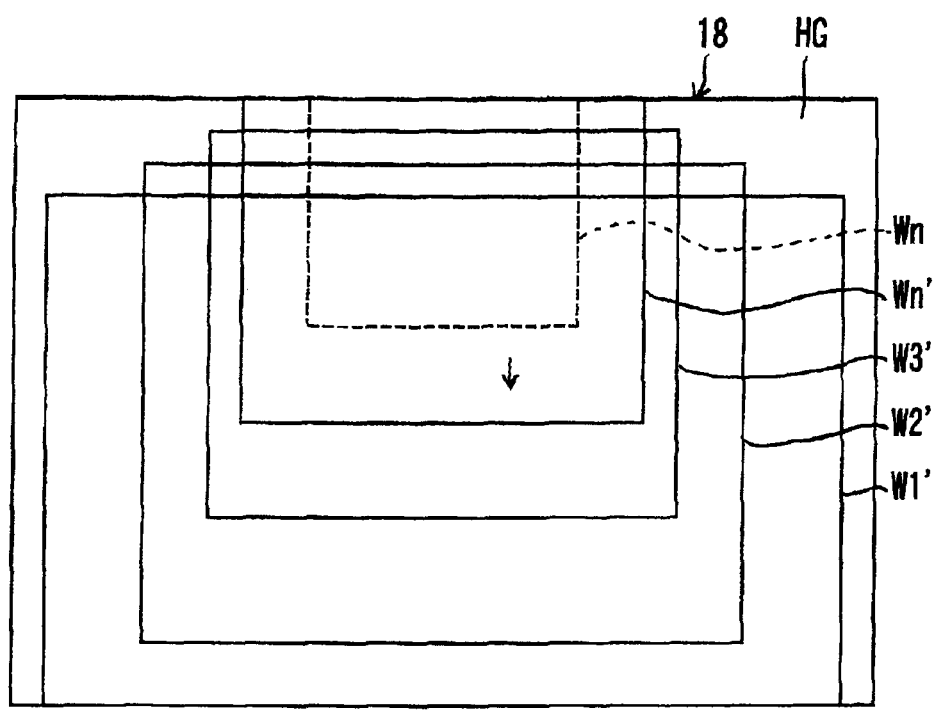
FIG. 30 is a diagram showing an example of the area frame after changing.
Figure 31:
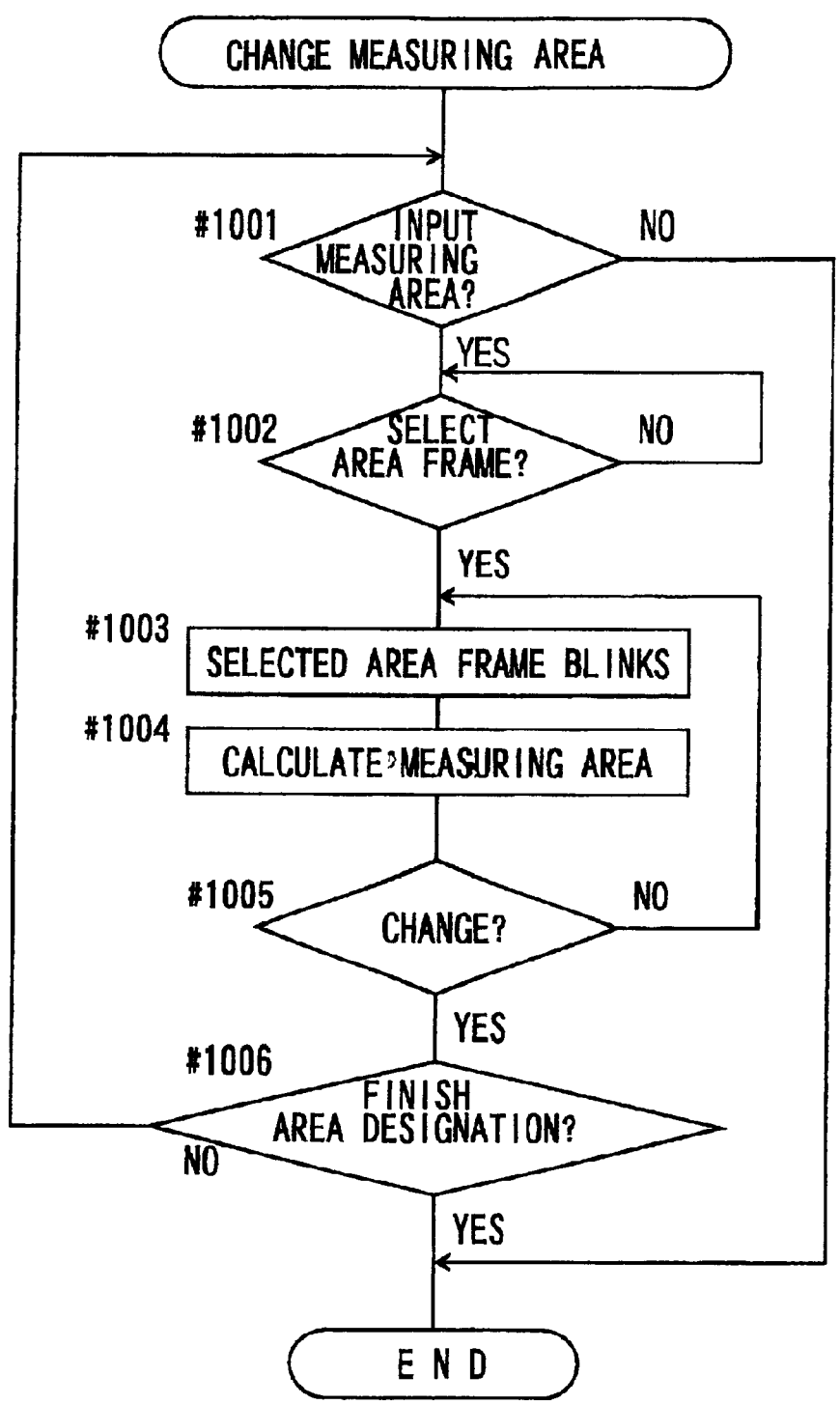
FIG. 31 is a flowchart showing a finder display process.

FIG. 30 is a diagram showing an example of the area frame W after changing. FIG. 31 is a flowchart showing a finder display process.

The flowchart shown in FIG. 31 is executed as a part of the subroutine of Step #201 shown in FIG. 23, and the measuring area EM is changed in this process.

In FIG. 31, when the user operates the operating portion 17 so as to input the intention of designating the measuring area EM (#1001), the area frame W can be selected. Then, the user selects an area frame W in which the user operates the cursor and the confirming button for changing (#1002). The selected area frame W blinks (#1003). The user operates the cursor so as to move the selected area frame W or a side thereof vertically or horizontally to a desired position. On this occasion, other area frames W except for the selected area frame W are also moved in the same way. Then, the area frame W is fixed.

Thus, as shown in FIG. 30 for example, the size and the position of the area frame W' indicating the changed measuring area EM are determined.

For the determined area frame W', the changed measuring area EM is calculated (#1004). This calculation is performed by the operation that is reverse to that used for determining the area frame W from the measuring area EM.

If the designated area frame W is changed (Yes in #1005), and if the user inputs the intention of finishing the designation of the measuring area EM (Yes in #1006), the process ends.

After that, the state indicating the designated measuring area EM is transmitted to the three-dimensional measuring unit 4. In the three-dimensional measuring unit 4, parameters are set in accordance with the received measuring area EM, and the measurement is performed.

In this way, the user can designate, change and confirm the measuring area EM, so that the desired three-dimensional data and two-dimensional image can be acquired easily.

Next, the method of displaying the three-dimensional data acquired by the measurement will be explained.

Figure 32:
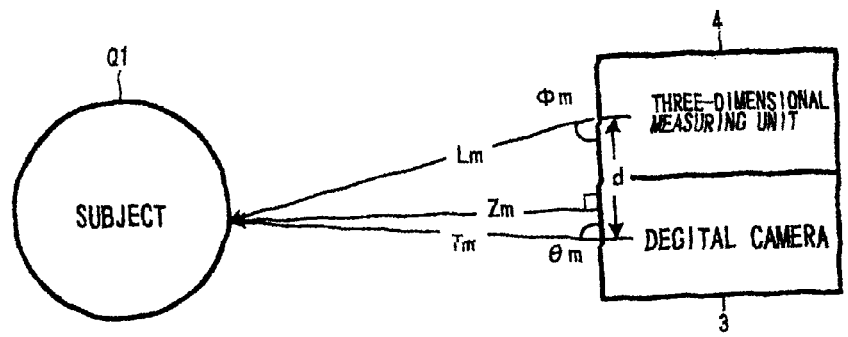
FIG. 32 is a diagram showing the relationship between three-dimensional data and a two-dimensional image of a subject.
Figure 33:
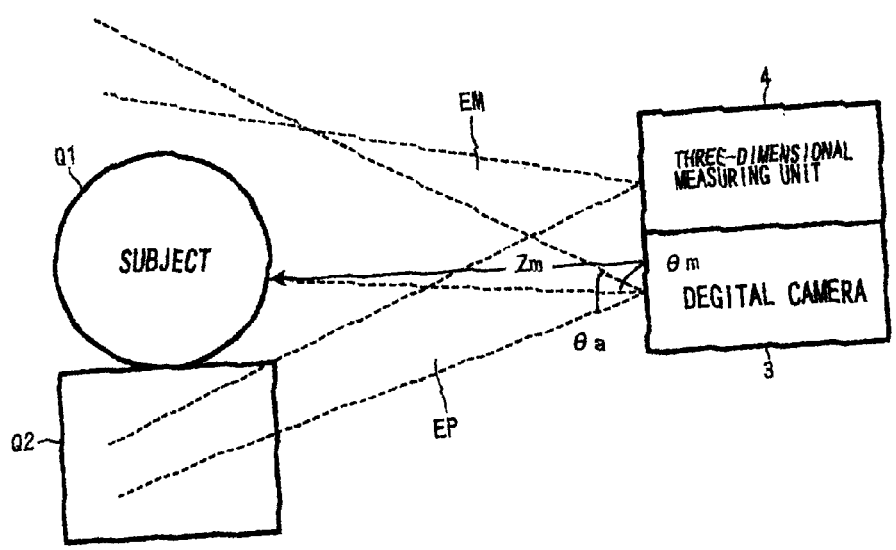
FIG. 33 is a diagram showing the relationship between three-dimensional data and a two-dimensional image of a subject.
Figure 34:
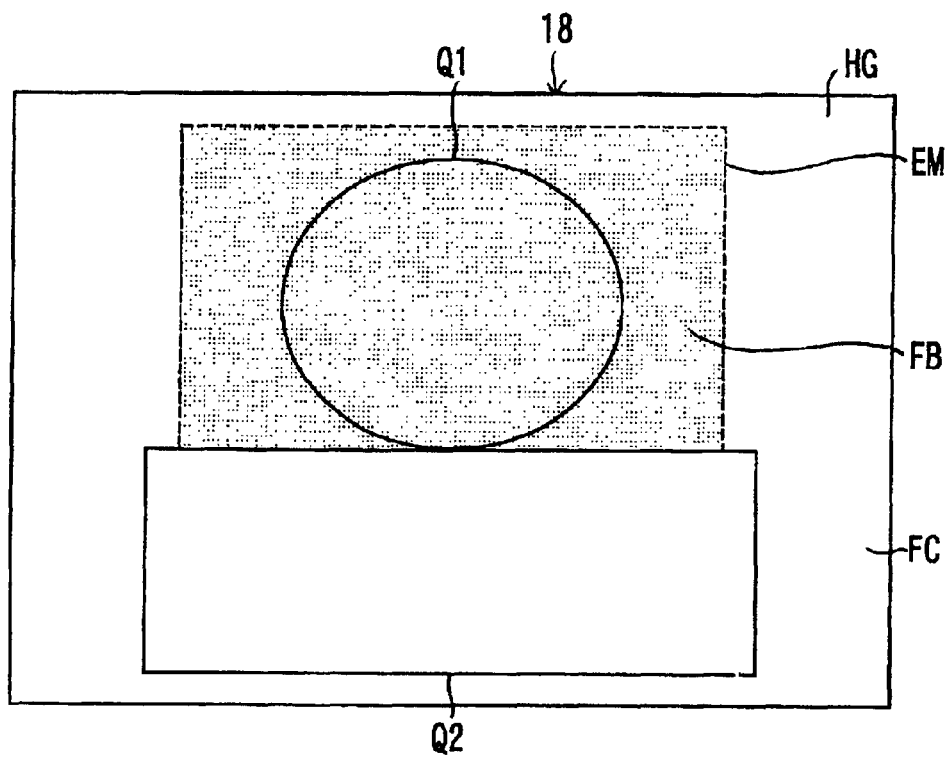
FIG. 34 is a diagram showing an example of display of the subject shown in FIG. 33 in the display portion.

FIGS. 32 and 33 are diagrams showing the relationship between three-dimensional data and a two-dimensional image of a subject. FIG. 34 is a diagram showing an example of display of the subject shown in FIG. 33 in the display portion 18.

As explained above, the three-dimensional data are displayed as a white and black light and shade image in the display portion 18.

As shown in FIG. 32, the three-dimensional data are expressed for each point of the surface of the subject Q1 with the distance Lm to each point and the angle φm. The direction of view line θm in the two-dimensional image of each measurement result is calculated in accordance with the distance d between the measuring origin of the three-dimensional measuring unit 4 and the fiducial point of the digital camera 3.

As shown in FIG. 33, in accordance with the calculated direction of view line θm and the angle of view θa of the two-dimensional image, the three-dimensional data Zm of each point of the two-dimensional image is displayed on the two-dimensional image as a white a black light and shade image. The displayed three-dimensional data can be based on either the distance Tm from the digital camera 3 or the distance Lm from the three-dimensional measuring unit 4.

As shown in FIG. 34, the screen HG of the display portion 18 displays the subjects Q1 and Q2. A portion within the measuring area EM is displayed as a light and shade image FB, and other portions are displayed as a color image FC.

Thus, the display portion 18 displays the two-dimensional image and the three-dimensional data, so that the user can confirm the measurement result right after the measurement. If the measured three-dimensional data are not desired data, the user can remeasure immediately so as to acquire desired three-dimensional data.

According to the above-mentioned embodiment, the three-dimensional measuring unit 4 can be attached to the digital camera 3 removably. When the three-dimensional measuring unit 4 is attached, automatic focusing control for photographing the two-dimensional image can be done by using the result of the three-dimensional measuring acquired by the three-dimensional measuring unit 4. Therefore, the automatic focusing control can be done with a high accuracy.

In addition, when the three-dimensional measuring unit 4 is not attached, the conventional automatic focusing control can be done by using the distance measuring portion 16 built in the digital camera 3, or by using another focusing state detecting means.

In the above-mentioned example, the distance measuring portion 16 does not work when the three-dimensional measuring unit is attached. However, the following structure is possible. Namely, the distance measuring portion 16 works and the distance measuring information is transmitted to the three-dimensional measuring unit. In the three-dimensional measuring unit, the measuring condition (such as a measuring area or a laser Intensity) is set in accordance with the distance measurement result.

According to this embodiment, an imaging system is provided wherein the two-dimensional photographing device and the three-dimensional measuring device can be attached to each other removably, so that both capturing of two-dimensional data and measuring of three-dimensional data can be performed with an easy operation.

As a structure for attaching the digital camera 3 to the three-dimensional measuring unit 4 removably, various structures can be used. For example, the body housing HC of the digital camera 3 and the body housing HT of the three-dimensional measuring unit 4 can be engaged with each other for being fastened. Alternatively, the both body housings HC and HT are provided with hook members, which are engaged with each other to be fastened.

In this embodiment, the digital camera 3 corresponds to the two-dimensional photographing device of the present invention. The three-dimensional measuring unit 4 corresponds to the three-dimensional measuring device of the present invention. The area sensor 11 corresponds to the photographing portion of the present invention. The receiving portion 30 or the controlling portion 40 corresponds to the calculation portion or the setting portion of the present invention. The controlling portion 40 and the connector 36, or, the two-dimensional controlling portion 20 and the connector 19 correspond to the transmitting portion and receiving portion of the present invention. The light projection and receiving portion 30 corresponds to the three-dimensional measuring portion of the present invention.

Next, other embodiments will be explained.

Figure 35:
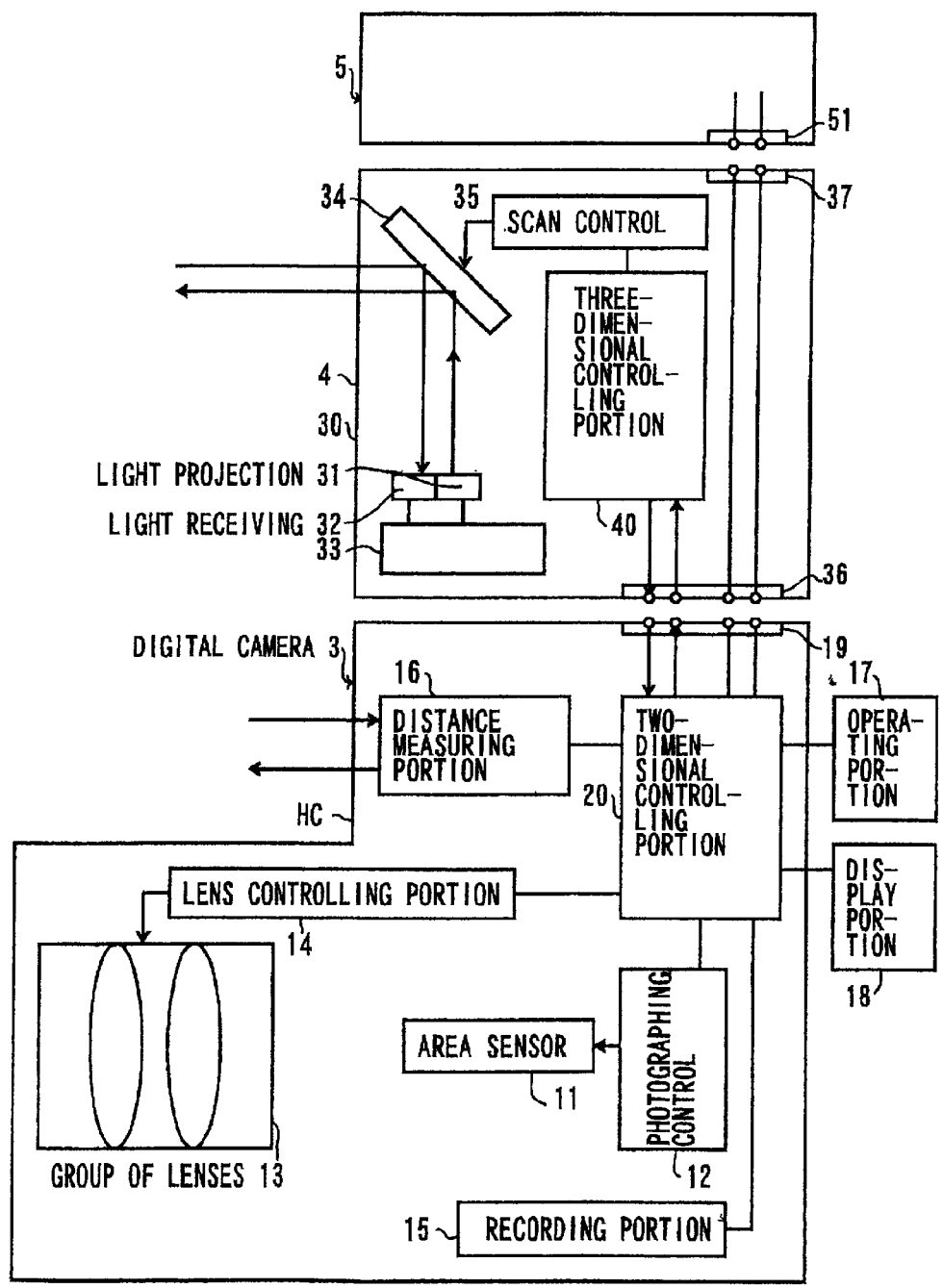
FIG. 35 is a diagram showing a schematic structure of a imaging system according to another embodiment of the present invention.

FIG. 35 is a diagram showing a schematic structure of a imaging system 1B according to another embodiment of the present invention. In the imaging system 1B shown in FIG. 35, the same reference code is used for denoting the portion having the same function as in the imaging system 1 shown in FIG. 1, and the explanation thereof will be omitted or briefed.

As shown in FIG. 35, the imaging system 1 includes a digital camera 3, a three-dimensional measuring unit 4 that is separated from the digital camera 3 and is attached to the digital camera 3 removably, and a flash lamp 5 that is attached to the three-dimensional measuring unit 4 or the digital camera 3 removably.

A connector 51 of the flash lamp 5 can be connected to either a connector 19 or a connector 37. The three-dimensional measuring unit 4 outputs a signal for the flash that was inputted via the connector 19 of the digital camera 3, to the connector 37 without changing.

Next, operations of the imaging system 1B will be explained in accordance with a screen displayed on the display portion 18 and with a flowchart.

Figure 36:
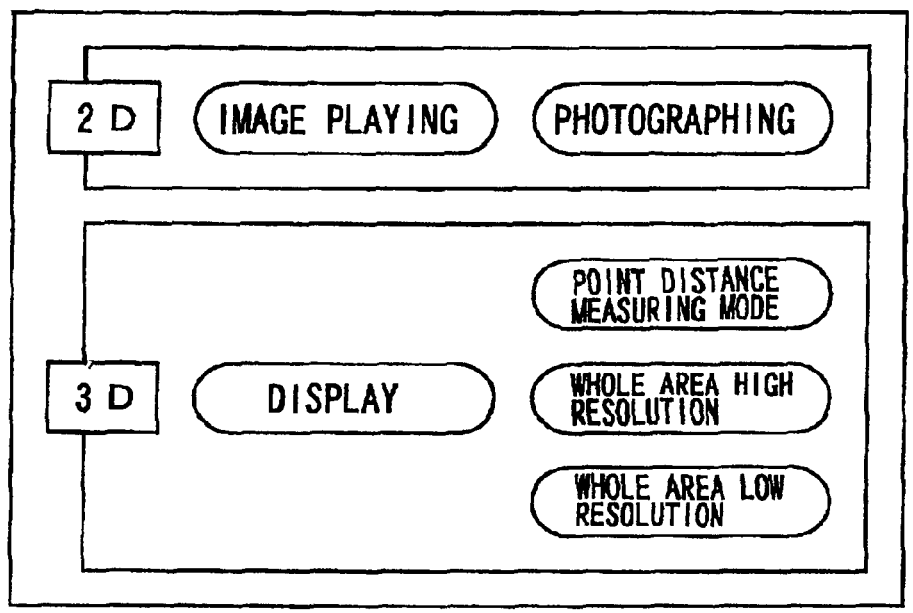
FIG. 36 is a diagram showing an example of a menu screen in the other embodiment.
Figure 38:
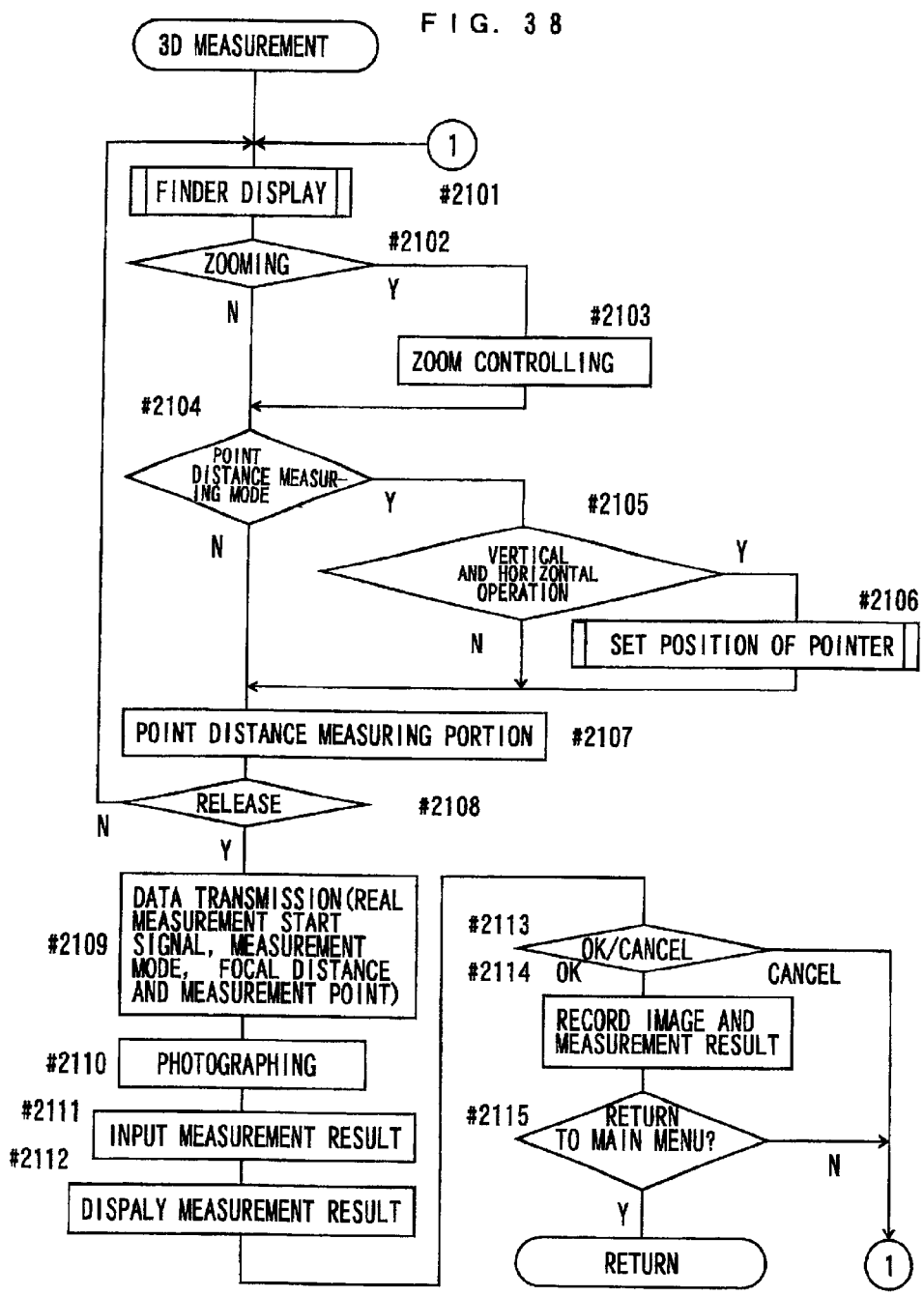
FIG. 38 is a flowchart showing a three-dimensional process routine in the other embodiment.
Figure 39:
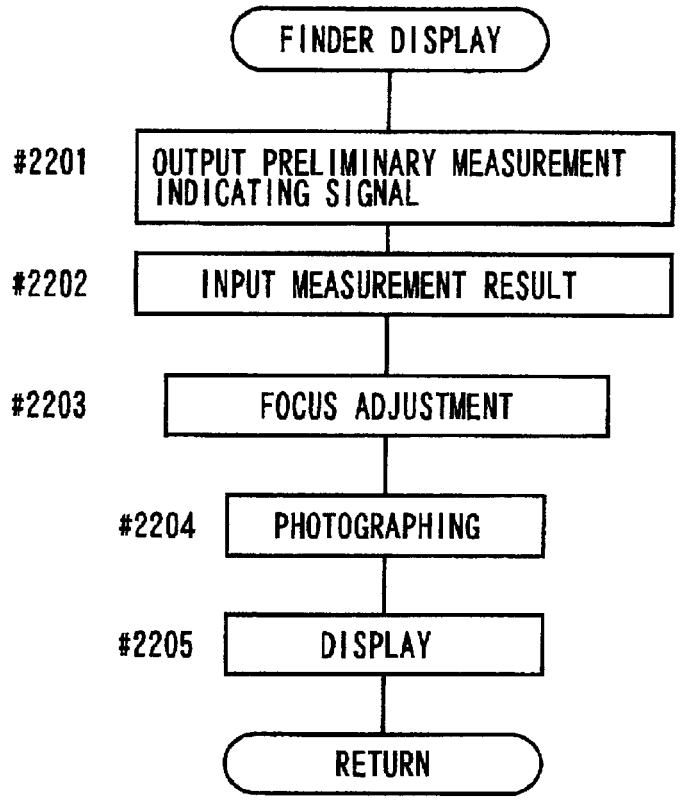
FIG. 39 is a flowchart showing a finder display process of a digital camera according to the embodiment.
Figure 40:
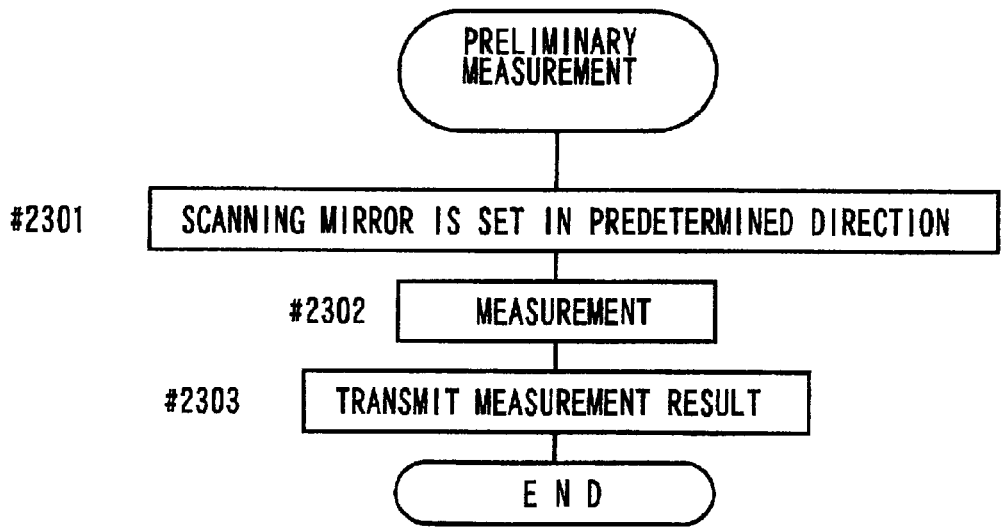
FIG. 40 is a diagram showing a preliminary measurement process of the three-dimensional measuring unit in the other embodiment.
Figure 41:
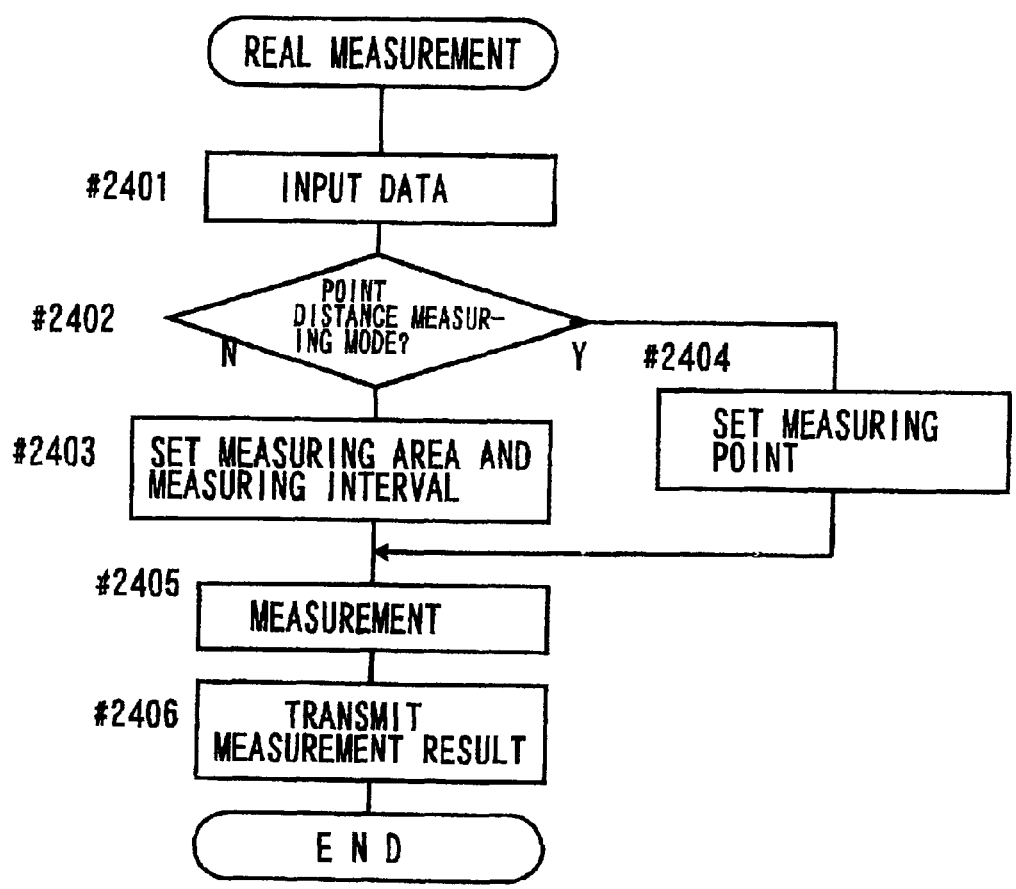
FIG. 41 is a flowchart showing a real measurement process of the three-dimensional measuring unit in the other embodiment.

FIG. 36 is a diagram showing an example of another menu screen HG3. FIGS. 37(A)–37(D) are diagrams showing an example of screens HG4–HG7 of a finder display that is displayed in the display portion 18. FIG. 38 is a flowchart showing a routine of the three-dimensional process of the digital camera 3. FIG. 39 is a flowchart showing a finder display process of a digital camera 3. FIG. 40 is a diagram showing a preliminary measurement process of the three-dimensional measuring unit 4. FIG. 41 is a flowchart showing a real measurement process of the three-dimensional measuring unit 4 in the other embodiment.

The control of the two-dimensional controlling portion 20 of the digital camera 3 is the same as the flowchart shown in FIG. 22.

Responding to whether the three-dimensional measuring unit 4 is attached or not, display portion 18 displays either the menu screen HG1 shown in FIG. 20 or the menu screen HG3 shown in FIG. 36.

Concerning the screens HG1 and HG3, the vertical and horizontal direction button of the operating portion 17 is operated for selecting a mode, and the confirming button of the operating portion 17 is operated for selecting the mode actually.

In a point distance measuring mode, distance of one or more points within the screen displayed in the finder is measured.

In a whole area high resolution mode, a whole area of the screen displayed in the finder is measured with a high resolution.

In a whole area low resolution mode, a whole area of the screen displayed in the finder is measured with a low resolution. For example, the measurement is performed with three-point interval to the whole area high resolution mode.

Then, responding to the mode selected in the menu screens HG1 and HG3, the process routine of each mode is executed (#106–109). If the point distance measuring mode, the whole area high resolution mode, or the whole area low resolution mode is selected, the three-dimensional measuring process routine is executed.

After finishing the process routine, the process returns to the step of displaying the menu screens HG1 and HG3.

As shown in FIG. 38, the process of Steps #2101–#2103 is the same as the process of Steps #201–#203 shown in FIG. 23. If the mode selected in Step #2104 is the point distance measuring mode, the operation of the vertical and the horizontal direction button is checked (#2105). If the operation is done, a pointer is displayed in the screen of the finder, and the pointer is moved responding to the operation of the button (#2106). The position of the pointer when the confirming button is operated is set as the measuring point and is memorized. It is possible to memorize plural measuring points. When designating a measuring point that is already memorized, the setting is canceled.

Figure 37A:
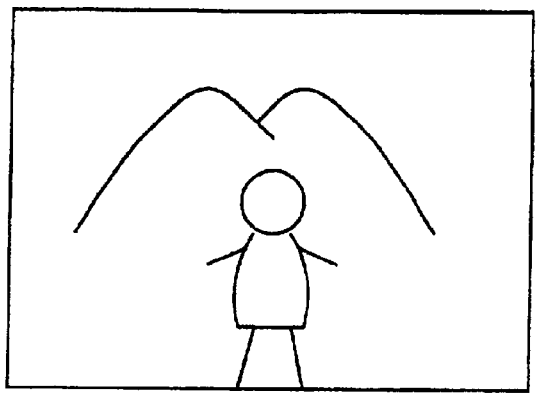
FIGS. 37(A)–37(D) are diagrams showing an example of a screen of a finder display that is displayed in the display portion.
Figure 37B:
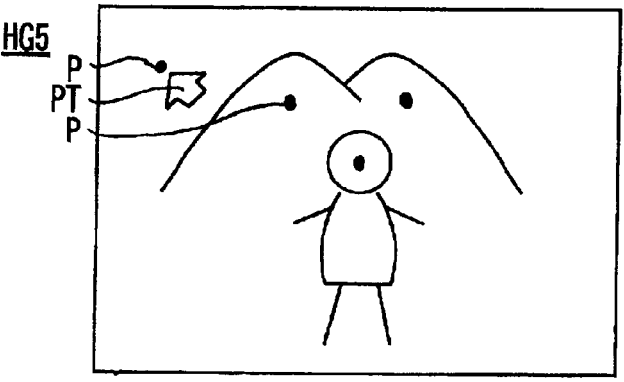

In addition, if the mode is the point distance measuring mode of the low resolution mode, the point P to be measured is overlaid on the screen HG5 in which the finder image is displayed as shown in FIG. 37(B) (#2107).

Thus, the user can confirm beforehand whether the desired position is measured or not.

When the release button is operated (Yes in #2108), information of the digital camera (the measuring mode, the focal distance, the coordinates of the measuring point) is transmitted to the three-dimensional measuring unit 4 along with the real measurement start signal (#2109).

Regarding a focal distance, the focal distance that is changed by the zooming operation is transmitted. If the digital camera 3 does not have a zooming function, the fixed focal distance is transmitted. Furthermore, the focal distance can be other data that are information specifying the area viewed through the finder. For example, it can be an angle of view information or information of the zooming lens position.

Regarding a measuring point, the coordinates of the measuring point set by the user are transmitted. However, if the setting operation is not performed, predetermined coordinates, e.g., the coordinates of the center of the screen are transmitted.

The process after Step #2110 is the same as the process after Step #207 shown in FIG. 23. Furthermore, the three-dimensional data that are the result of the three-dimensional measuring are displayed as an image in which the distance is expressed by light and shade. In the case of the point distance measuring mode, a value is displayed instead of an image.

As shown in FIG. 39, in the finder process, a preliminary measurement indicating signal is outputted to the three-dimensional measuring unit 4 (#2201), the measurement result data are inputted from the three-dimensional measuring unit 4(#2202), a focus adjustment is performed in accordance therewith (#2203), the two-dimensional image is photographed (#2204), and the result is displayed in the display portion 18 (#2205).

The flowchart of the preliminary measurement shown in FIG. 40 is performed when the three-dimensional measuring unit 4 receives the preliminary measurement indicating signal from the digital camera 3.

Since the preliminary measurement is a distance measurement for adjusting the focus upon the finder display, one point is measured simply. For the purpose, the scanning mirror 34 is set in predetermined direction (#2301). For example, it is set so as to measure a distance at the center within the photographing area. After measuring (#2302), the result is transmitted to the digital camera 3 (#2303).

The flowchart of the real measurement shown in FIG. 41 is performed when the three-dimensional measuring unit 4 receives the real measurement starting signal from the digital camera 3.

First, information that is transmitted along with the real measurement starting signal in Step #2109 as mentioned above is inputted (#2401). Among the inputted information, the information of the measuring mode is referred for setting a measuring point corresponding to each mode.

In the case of the point distance measuring mode (Yes in #2402), the coordinates of the measuring point set in Step #2105 and Step #2106 mentioned above (or the center coordinates if there is no point set by the user) is set as the measuring point (#2404). Furthermore, the direction of the measuring point is calculated and is set in accordance with the information of the focal distance.

In the case except for the point distance measuring mode, i.e., in the case of the whole area high resolution mode or the whole area low resolution mode (No in #2402), the measuring point is set by the measuring area and the measuring interval (#2403). On this occasion, in accordance with the information of the focal distance that is transmitted from the digital camera 3, the measuring area is set so as to be identical to the area displayed in the finder.

The distance measurement is performed for the set measuring point (#2405), and the measurement result is transmitted to the digital camera 3 (#2406).

Next, the photographing mode will be explained.

In the photographing mode, regardless of whether the three-dimensional measuring unit 4 is attached or not, the focus adjustment can be performed in accordance with the measurement result of the distance measuring portion 16. If the three-dimensional measuring unit 4 is attached, the measurement result of the three-dimensional measuring unit 4 is inputted for performing the focus adjustment in accordance with the measurement result.

In the former case, the common routine is used for photographing.

In the latter case, as mentioned above, a high accuracy of the focus adjustment can be acquired. This example will be explained as below.

Figure 42:
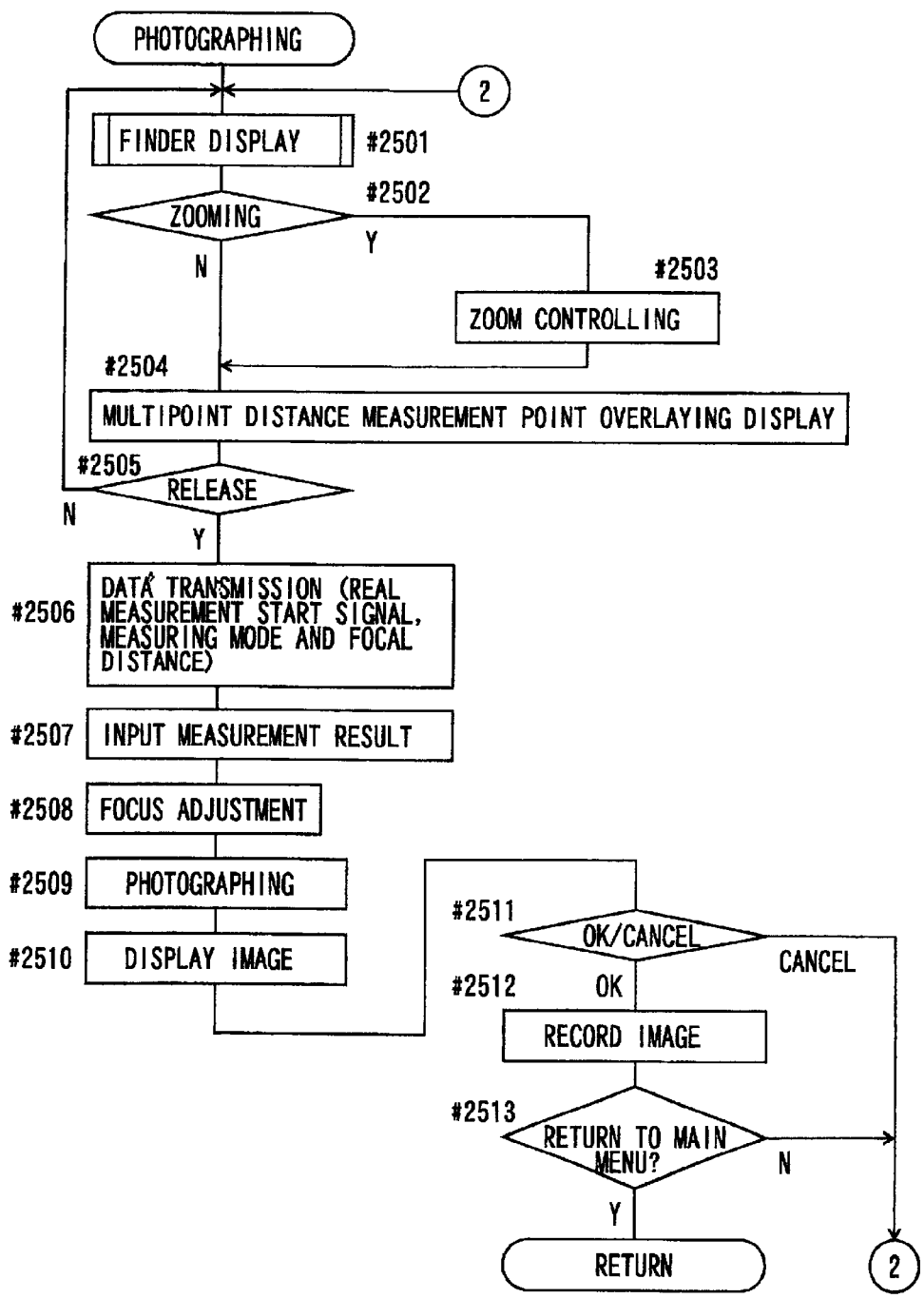
FIG. 42 is a flowchart showing a photographing process routine of the digital camera in the other embodiment.
Figure 43:
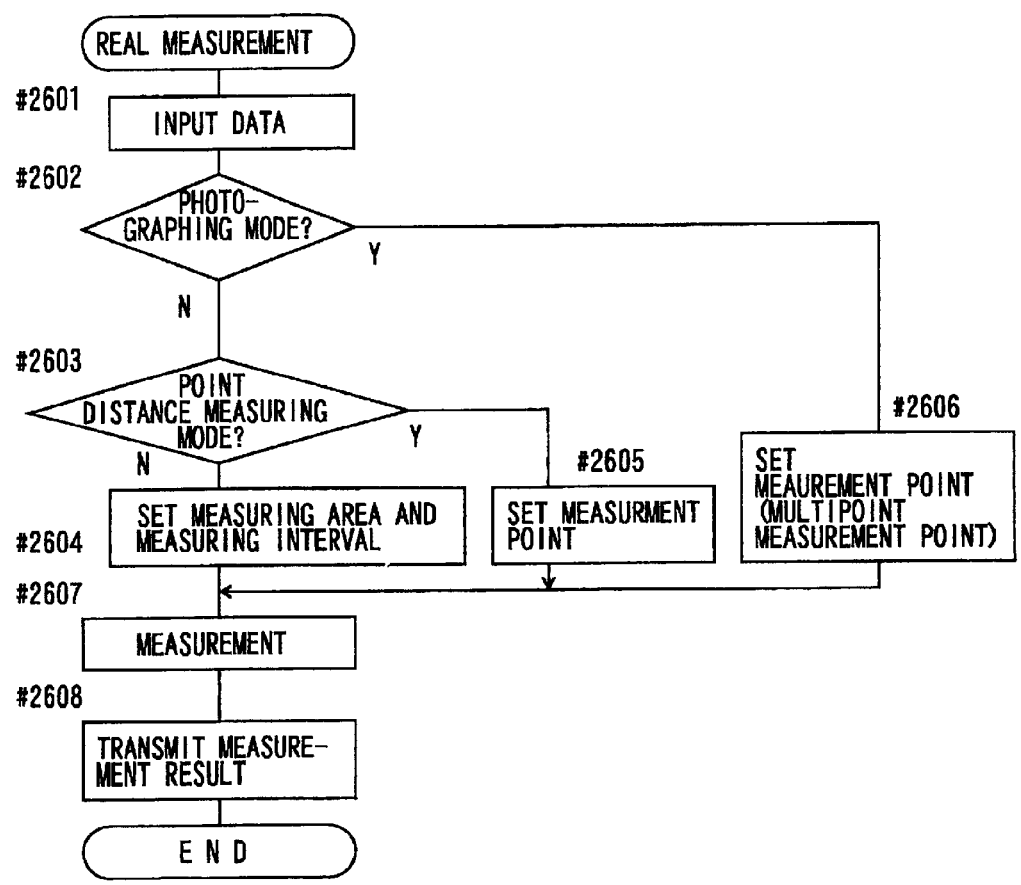
FIG. 43 is a flowchart showing a variation of the real measurement process in the other embodiment.

FIG. 42 shows a "photographing" routine of the digital camera 3 to which the three-dimensional measuring unit 4 is attached. This routine is executed when "photograph" within the "2D" frame is selected in the screen HG3 shown in FIG. 3. FIG. 43 is a flowchart showing a variation of the real measurement process in the three-dimensional measuring unit 4 corresponding to FIG. 42. In the variation shown in FIG. 43, a multipoint measurement is performed.

If the digital camera 3 is equipped with the three-dimensional measuring unit 4, the focus adjustment can be performed by distance measurement of the three-dimensional measuring unit 4 when photographing a two-dimensional image.

In the three-dimensional measuring unit 4, the distance measurement can be performed for any point within the screen. Therefore, if the distance measuring portion 16 of the digital camera 3 can perform the distance measurement only for one point, it is better to perform the distance measurement by the three-dimensional measuring unit 4 for plural points. When photographing two figures, the distance measurement of one point may measure the distance to the background between the two figures, i.e., a so-called "middle dropout" may occur, which can be prevented by the multipoint distance measurement.

In addition, the time of flight method has much higher accuracy than an active triangulation distance measurement that is usually used in a camera. Therefore, using the result of the distance measurement of the three-dimensional measuring unit 4, higher accuracy of focusing can be obtained.

Figure 37C:
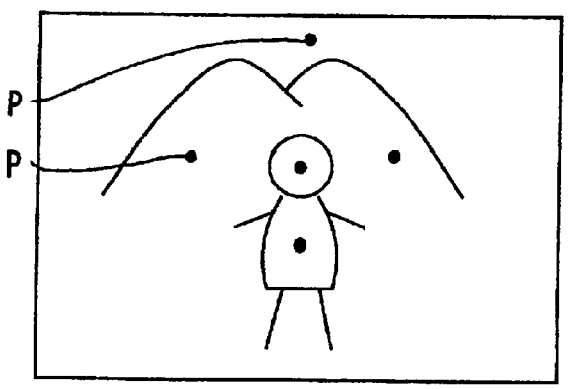

In Step #2504 of FIG. 42, the multipoint distance measurement point overlaying display is performed. The multipoint distance measurement points are, for example, as shown in FIG. 37(C), plural points in the middle portion of the screen of the finder display, and the location of the point can be a cross location or other conventional location.

After inputting the multipoint distance measurement result (#2507), the conventional detection of the main subject is performed in accordance with the distance measurement result, and the focus adjustment is performed for the main subject (#2508).

In FIG. 43, it is decided whether it is the photographing mode (#2602). If it is the photographing mode, the coordinates of a predetermined multipoint distance measurement point are set (#2606). Here, in accordance with the information of the focal distance, the direction of the measuring point is calculated and set.

Figure 37D:
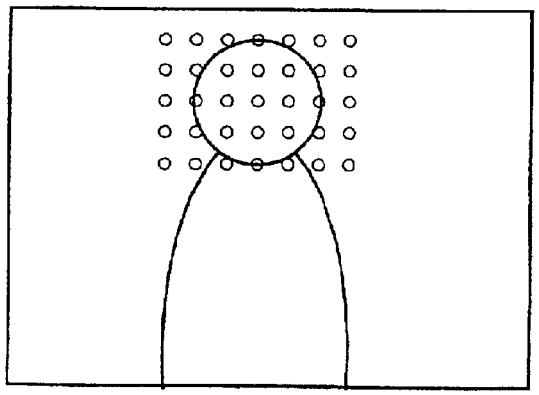

Regarding the above-mentioned flowchart, other various variations can be adopted. For example, in the overlaying display of the measuring points in Step #2107 shown in FIG. 38, if the measuring points are crowded, the display is difficult to observe. Therefore, as shown in FIG. 37(D), the user can designate the position, which is enlarged in the display.

In addition, as a method of the automatic focusing control of the digital camera 3, the method can be used in which the contrast of the photographed two-dimensional image is used for detecting the focused state and for adjusting. Alternatively, a phase difference detecting method can be used for detecting and adjusting the focused state. In these cases, appropriate conventional means for detecting a focused state can be used instead of the above-mentioned distance measuring portion 16.

According to this embodiment, a user-friendly imaging system can be realized, which can be used for acquiring both two-dimensional data and three-dimensional data.

In this embodiment, the area sensor 11, the photographing controlling portion 12, the group of lenses 13, and the lens controlling portion 14 correspond to the photographing portion of the present invention. The group of lenses 13 corresponds to the optical system of the present invention. The lens controlling portion 14 and the two-dimensional controlling portion 20 correspond to the controlling portion of the present invention. The distance measuring portion 16 and the two-dimensional controlling portion 20 corresponds to the focused state detecting portion of the present invention. The connector 19 and the two-dimensional controlling portion 20 correspond to the receiving portion of the present invention. The connector 36 and the three-dimensional controlling portion 40 correspond to the outputting portion of the present invention. The receiving portion 30 corresponds to the measuring portion of the present invention.

The structure, the shape, the number, the material of the entire or each part of the digital camera 3, the three-dimensional measuring unit 4, or the imaging system 1, the content and the order of the process, or the process timing can be modified within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A system comprising
   a two dimensional photographing device; and
   a three-dimensional measuring device that is removably attached to the two-dimensional photographing device, the two-dimensional photographing device and the three-dimensional measuring device communicating with each other, wherein
   information indicating an operating condition of one of the devices is transmitted to the other device, which receives the information and sets the own operating condition in accordance with the received information for photographing or measuring, and
   the three-dimensional measuring device can perform three-dimensional measuring by itself.

2. The system according to claim 1, wherein the operating condition of the two-dimensional photographing device includes at least one of a photographing area, a photographing resolution, a focal distance, the number of pixels and a magnification ratio, and the operating condition of the three-dimensional measuring device includes at least one of a measuring area, a measuring resolution, an angle indicating the measuring area, and the number of the measuring points.

3. A system comprising:
   a two-dimensional photographing device including
   a photographing portion for photographing the two-dimensional image of a subject, and
   a transmitting portion for transmitting information indicating a photographing condition of the photographing portion; and
   a three-dimensional measuring device that is removably attached to the two-dimensional photographing device, the three-dimensional measuring device including
   a receiving portion for receiving information transmitted from the two-dimensional photographing device,
   a setting portion for setting a measurement condition in accordance with the received information, and
   a three-dimensional measuring portion for measuring a three-dimensional shape in accordance with the set measurement condition, wherein
   the three-dimensional measuring device can perform three-dimensional measuring by itself.

4. The system according to claim 3, wherein the information indicating the photographing condition is a photographing area and a photographing resolution of the photographing portion, and the information indicating the measurement condition is a measuring area and a measuring resolution of the three-dimensional measuring portion.

5. The system according to claim 3, wherein the two-dimensional photographing device and the three-dimensional measuring device are enclosed with housings that are separated from each other and one of the housings is attached to the other to make one body.

6. A system comprising:
   a two-dimensional photographing device including
   a photographing portion for photographing the two-dimensional image of a subject,
   a calculating portion for calculating information related to the measurement condition of the two-dimensional measuring device in accordance with the photographing condition of the photographing portion, and
   a transmitting portion for transmitting the information calculated by the calculating portion; and a three-dimensional measuring device that is removably attached to the two-dimensional photographing device, the three-dimensional measuring device including a receiving portion for receiving information transmitted from the two-dimensional photographing device, a setting portion for setting a measurement condition in accordance with the received information, and a three-dimensional measuring portion for measuring a three-dimensional shape in accordance with the set measurement condition.

7. A system comprising:

a two-dimensional photographing device;

a three-dimensional measuring device that is removably attached to the two-dimensional photographing device, the three-dimensional measuring device including three-dimensional measuring portion for measuring a three-dimensional shape of a subject, a transmitting portion for transmitting information of a measurement condition of the three-dimensional measuring portion; and the two-dimensional photographing device including a receiving portion for receiving the information transmitted from the three-dimensional measuring device, a setting portion for setting a photographing condition in accordance with the received information, and a photographing portion for acquiring a two-dimensional image of the subject in accordance with the set photographing condition.

8. A system comprising:

a two-dimensional photographing device;

a three-dimensional measuring device that is removably attached to the two-dimensional photographing device, the three-dimensional measuring device including a three-dimensional measuring portion for measuring a three-dimensional shape of a subject, a calculating portion for calculating information related to a photographing condition of the two-dimensional photographing device in accordance with a measurement condition of the three-dimensional measuring portion, a transmitting portion for transmitting information calculated by the calculating portion; and the two-dimensional photographing device including a receiving portion for receiving the information transmitted from-the three-dimensional measuring device, a setting portion for setting a photographing condition in accordance with the received information, and a photographing portion for photographing a two-dimensional image of the subject in accordance with the set photographing condition.

9. A system comprising:

a two-dimensional photographing device;

a three-dimensional measuring device that is removably attached to the two-dimensional photographing device, the three-dimensional measuring device including a three-dimensional measuring portion for measuring a three-dimensional shape of a subject, a transmitting portion for transmitting information indicating a measurement condition of the three-dimensional measuring portion, and a receiving portion for receiving the information transmitted from the two-dimensional photographing device, a setting portion for setting a measurement condition in accordance with the received information when receiving portion received the information transmitted from the two-dimensional photographing device; and the two-dimensional photographing device including a photographing portion for photographing a two-dimensional image of a subject, a transmitting portion for transmitting information indicating a photographing condition of the photographing portion, a receiving portion for receiving the information transmitted from the three-dimensional measuring device, and a setting portion for setting a photographing condition in accordance with the received information when the receiving portion received the information transmitted from the three-dimensional measuring device.

10. A two-dimensional photographing device to which a three-dimensional measuring device is removably attached, the two-dimensional photographing device comprising:

a photographing portion for photographing a two-dimensional image of a subject, and a transmitting portion for transmitting information indicating a photographing condition of the photographing portion to the three-dimensional measuring device and for transmitting instructions for three-dimensional measurement, wherein the three-dimensional measuring device can perform three-dimensional measuring by itself.

11. A two-dimensional photographing device to which a three-dimensional measuring device is removably attached, the two-dimensional photographing device comprising:

receiving portion for receiving information transmitted from the three-dimensional measuring device;

a setting portion for setting a photographing condition in accordance with the received information; and a photographing portion for photographing a two-dimensional image of the subject in accordance with the set photographing condition.

12. A three-dimensional measuring device that is removably attached to a two-dimensional photographing device, the three-dimensional measuring device comprising:

a three-dimensional measuring portion for measuring a three-dimensional shape of a subject, and a transmitting portion for transmitting information indicating a measurement condition of the three-dimensional measuring portion, wherein the three-dimensional measuring device can perform three-dimensional measuring by itself.

13. A three-dimensional measuring device that is removably attached to a two-dimensional photographing device, the three-dimensional measuring device comprising:

a receiving portion for receiving information transmitted from the two-dimensional photographing device;

a setting portion for setting a measurement condition in accordance with the received information;

a three-dimensional measuring portion for measuring a three-dimensional shape of the subject in accordance with the set measurement condition, wherein the three-dimensional measuring device can perform three-dimensional measuring by itself.

14. A system comprising:

a two-dimensional photographing device;

a three-dimensional measuring device that is removably attached to the two-dimensional photographing device, the three-dimensional measuring device including a measuring portion for measuring a distance to a subject at least for one point, an outputting portion for outputting the measured distance information to the two-dimensional photographing device; and the two-dimensional photographing device including a photographing portion for photographing a two-dimensional image of the subject, an optical system for forming a subject image in the photographing portion, a receiving portion for receiving the measured distance information outputted from the three-dimensional measuring device, and a controlling portion for controlling a focused state of the optical system in accordance with the measured distance information received by the receiving portion.

15. A two-dimensional photographing device to which a three-dimensional measuring device is removably attached, the two-dimensional photographing device comprising:

a photographing portion for photographing a two-dimensional image of a subject;

an optical system for forming a subject image in the photographing portion;

a receiving portion for receiving measured distance information from the three-dimensional measuring device; and a controlling portion for controlling a focused state of the optical system in accordance with the measured distance information received by the receiving portion.

16. The two-dimensional photographing device according to claim 15, wherein the two-dimensional photographing device includes a focused state detecting portion for detecting information regarding a focused state of the optical system for the subject, and the focused state of the optical system is adjusted in accordance with the detection result of the focused state detecting portion when the three-dimensional measuring device is not attached to the two-dimensional photographing device.

17. A three-dimensional measuring device that is removably attached to a two-dimensional photographing device, the three-dimensional measuring device comprising:

an acquiring portion for acquiring measurement result information by measuring a distance to a subject at least for one point within a photographing area of the two-dimensional photographing device; and an outputting portion for outputting the measurement result information to the two-dimensional photographing device.

18. The three-dimensional measuring device according to claim 17, wherein the three-dimensional measuring device has a mode of measuring uniformly in a predetermined area and a mode of measuring one or more discrete points in the area for acquiring the measurement result information.

* * * * *